(12) United States Patent
Bae et al.

(10) Patent No.: US 11,264,615 B2
(45) Date of Patent: Mar. 1, 2022

(54) BINDER, ELECTRODE AND LITHIUM BATTERY INCLUDING THE SAME, AND METHOD OF PREPARING THE BINDER

(71) Applicants: Samsung Electronics Co., Ltd., Suwon-si (KR); Samsung SDI Co., Ltd., Yongin-si (KR)

(72) Inventors: Woojin Bae, Yongin-si (KR); Kanghee Lee, Suwon-si (KR); Heechul Jung, Gunpo-si (KR); Seongho Jeon, Yongin-si (KR); Sungsoo Han, Hwaseong-si (KR)

(73) Assignees: SAMSUNG ELECTRONICS CO., LTD., Gyeonggi-Do (KR); SAMSUNG SDI CO.. LTD., Gyeonggi-Do (KR)

( * ) Notice: Subject to any disclaimer, the term of this patent is extended or adjusted under 35 U.S.C. 154(b) by 354 days.

(21) Appl. No.: 16/105,045

(22) Filed: Aug. 20, 2018

(65) Prior Publication Data

US 2019/0067699 A1 Feb. 28, 2019

(30) Foreign Application Priority Data

Aug. 24, 2017 (KR) .......................... 10-2017-0107403
Aug. 9, 2018 (KR) .......................... 10-2018-0093144

(51) Int. Cl.
| | |
|---|---|
| *H01M 2/14* | (2006.01) |
| *H01M 4/62* | (2006.01) |
| *H01M 4/133* | (2010.01) |
| *H01M 4/134* | (2010.01) |

(Continued)

(52) U.S. Cl.
CPC ............... *H01M 4/622* (2013.01); *C08J 3/24* (2013.01); *C08J 3/246* (2013.01); *H01M 4/133* (2013.01);
(Continued)

(58) Field of Classification Search
CPC ...... H01M 4/622; H01M 4/133; H01M 4/134; H01M 4/386; H01M 4/387; H01M 4/584;
(Continued)

(56) References Cited

U.S. PATENT DOCUMENTS 9,373,843 B2 * 6/2016 Lee ....................... H01M 4/133
2007/0048609 A1 3/2007 Ueda et al.
(Continued)

FOREIGN PATENT DOCUMENTS

| JP | 2004172035 A | 6/2004 |
|---|---|---|
| JP | 200795670 A | 4/2007 |

(Continued)

*Primary Examiner* — Jane J Rhee
(74) *Attorney, Agent, or Firm* — Cantor Colburn LLP

(57) ABSTRACT

A binder includes a cross-linked product of at least a first polymer, a second polymer, and a third polymer, wherein the cross-linked product is cross-linked by at least two ester bonds; the first polymer includes polyimide, polyamic acid, a copolymer thereof, or a combination thereof, wherein the first polymer includes a structural unit including an alkali metal and a structural unit including at least one hydroxyl functional group; the second polymer includes poly(acrylic acid), poly(methacrylic acid), a copolymer thereof, or a combination thereof; and the third polymer includes polyvinyl alcohol, polyacrylamide, polymethacrylamide, a copolymer thereof, or a combination thereof.

29 Claims, 14 Drawing Sheets

(51) Int. Cl.
  *H01M 4/36* (2006.01)
  *H01M 4/38* (2006.01)
  *H01M 10/0525* (2010.01)
  *C08J 3/24* (2006.01)
  *H01M 4/587* (2010.01)
  *H01M 4/02* (2006.01)
  *H01M 10/052* (2010.01)

(52) U.S. Cl.
  CPC .......... *H01M 4/134* (2013.01); *H01M 4/364* (2013.01); *H01M 4/386* (2013.01); *H01M 4/387* (2013.01); *H01M 4/587* (2013.01); *H01M 4/623* (2013.01); *H01M 10/0525* (2013.01); *C08J 2333/02* (2013.01); *C08J 2429/04* (2013.01); *C08J 2479/02* (2013.01); *H01M 10/052* (2013.01); *H01M 2004/021* (2013.01); *H01M 2004/027* (2013.01)

(58) Field of Classification Search
  CPC ............ H01M 4/623; H01M 10/0525; H01M 2004/021; H01M 2004/027; C08J 3/24; C08J 3/246; C08J 2333/02; C08J 2429/04; C08J 2429/02
  See application file for complete search history.

(56) References Cited

U.S. PATENT DOCUMENTS

| | | | | |
|---|---|---|---|---|
| 2010/0323242 | A1* | 12/2010 | Choi | H01M 4/44 429/217 |
| 2012/0070737 | A1* | 3/2012 | Son | C08J 3/247 429/217 |
| 2012/0095131 | A1* | 4/2012 | Kinoshita | H01M 10/0525 523/410 |
| 2015/0030922 | A1* | 1/2015 | Kobayashi | H01M 4/139 429/217 |
| 2016/0172665 | A1 | 6/2016 | Zhou et al. | |
| 2017/0155151 | A1 | 6/2017 | Bae et al. | |
| 2018/0026270 | A1 | 1/2018 | Bae et al. | |

FOREIGN PATENT DOCUMENTS

| | | |
|---|---|---|
| JP | 2015204133 A | 11/2015 |
| JP | 2016213027 A | 12/2016 |
| KR | 101090598 B1 | 11/2011 |
| KR | 101708359 B1 | 2/2017 |
| KR | 1020170061417 A1 | 6/2017 |
| KR | 1020180010789 A | 1/2018 |

* cited by examiner $R_t = 19$ μm, $R_a = 1.8$ μm $R_t = 57$ μm, $R_a = 6.7$ μm

BINDER, ELECTRODE AND LITHIUM BATTERY INCLUDING THE SAME, AND METHOD OF PREPARING THE BINDER

CROSS-REFERENCE TO RELATED APPLICATION

This application claims priority to and the benefit of Korean Patent Application No. 10-2017-0107403, filed on Aug. 24, 2017, in the Korean Intellectual Property Office, and Korean Patent Application No. 10-2018-0093144, filed on Aug. 9, 2018, in the Korean Intellectual Property Office, and all the benefits accruing therefrom under 35 U.S.C. § 119, the disclosures of which are incorporated herein in their entireties by reference.

BACKGROUND

1. Field

One or more embodiments of the present disclosure relates to a binder, an electrode, and a lithium battery including the same, and a method of preparing the binder.

2. Description of the Related Art

Polyvinylidene fluoride (PVdF) and styrene-butadiene rubber/carboxymethyl cellulose (SBR/CMC) have been widely used as binders for electrodes in lithium batteries. However, when a binder such as PVdF and SBR/CMC is used as an electrode binder together with an electrode active material, for example, a silicon electrode active material, that undergoes a large volume change (i.e., expansion and shrinkage) during charging and discharging of a battery, it is difficult to maintain the mechanical properties of an electrode plate. Additionally, it is difficult to maintain adhesion between an electrode active material layer and a current collector or the inside the electrode active material layer.

In order to improve such mechanical properties and adhesion, a polyimide binder, polyvinyl alcohol, and the like have been considered as electrode binders. For example, a polyimide binder and polyvinyl alcohol have been used alone or in combination.

However, when a binder including polyimide and polyvinyl alcohol is applied to lithium batteries, bubbles are formed by polyvinyl alcohol during preparation of an electrode slurry, thereby causing an electrode plate to have a curved surface.

Therefore, there is a need to develop a binder capable of suppressing formation of bubbles, forming an electrode plate having a less curved surface, providing excellent physical properties to an electrode plate, and providing excellent charge and discharge characteristics.

SUMMARY

Provided are binders suppressing formation of bubbles.

Provided are electrodes including an electrode plate having a less curved surface and excellent physical properties.

Provided are lithium batteries having high initial efficiency, Coulombic efficiency, discharge capacity, and capacity retention.

Provided are methods of preparing a binder suppressing formation of bubbles.

Additional aspects will be set forth in part in the description which follows and, in part, will be apparent from the description, or may be learned by practice of the presented embodiments.

According to an aspect of an embodiment, a binder includes a cross-linked product of at least a first polymer, a second polymer, and a third polymer, wherein the cross-linked product is cross-linked by at least two ester bonds or at least one ester bond and at least one amide bond; the first polymer includes polyimide, polyamic acid, a copolymer thereof, or a combination thereof, wherein the first polymer includes a structural unit including an alkali metal and at least one hydroxyl functional group in the same or different structural units; the second polymer includes poly(acrylic acid), poly(methacrylic acid), a copolymer thereof, or a combination thereof; and the third polymer includes polyvinyl alcohol, polyacrylamide, polymethacrylamide, a copolymer thereof, or a combination thereof.

According to an aspect of another embodiment, an electrode includes the binder, and a positive active material or a negative active material.

According to an aspect of another embodiment, a lithium battery includes a first electrode as described above, a second electrode, and an electrolyte disposed between the first electrode and the second electrode.

According to an aspect of another embodiment, a method of preparing a binder includes: mixing a first composition including a non-aqueous solvent and a first polymer including polyimide, polyamic acid, a copolymer thereof, or a combination thereof, wherein the first polymer includes a structural unit including an alkali metal and a structural unit including at least one hydroxyl functional group; a second composition including water and a second polymer including poly(acrylic acid), poly(methacrylic acid), polyacrylamide, polymethacrylamide, a copolymer thereof, or a combination thereof; and a third composition including water and a third polymer including polyvinyl alcohol, polyacrylamide, polymethacrylamide, a copolymer thereof, or a combination thereof to prepare a mixture; and heat-treating the mixture to prepare a cross-linked product and prepare the binder.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
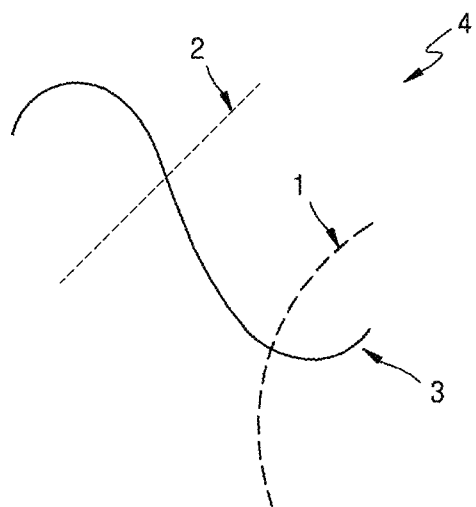
FIG. 1 is a schematic view of a cross-linked product of a binder, according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

As used herein, the term "and/or" includes any and all combinations of one or more of the associated listed items. "Or" means "and/or." The singular forms "a," "an," and "the" are intended to include the plural forms. Expressions such as "at least one of," when preceding a list of elements, modify the entire list of elements and do not modify the individual elements of the list. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

As used herein, the term "cross-link" refers to a bond connecting one polymer chain with another polymer chain. Throughout the specification, the bond is a covalent bond.

As used herein, the term "linker" refers to a functional group that connects one polymer chain to another polymer chain.

Throughout the specification, a substituent as used in the formulae means a group or compound wherein at least one hydrogen atom thereof is substituted with another atom or group. Unless otherwise stated, the term "substituted" refers to a compound or radical substituted with at least one of a halogen atom (e.g., F$^-$, Cl$^-$, Br$^-$, I$^-$), a C1-C20 alkyl group substituted with a halogen atom (e.g., $CF_3$, $CHF_2$, $CH_2F$, and $CCl_3$), a hydroxyl group, a nitro group, a cyano group, an amino group, an amidino group, a hydrazine group, a hydrazone group, a carbonyl group (C=O), a carboxyl group (C(=O)OH) or a salt thereof, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C3-C20 heteroaryl group, a C3-C20 heteroarylalkyl group, a C3 to C20 cycloalkyl group, a C3 to C15 cycloalkenyl group, a C6 to C15 cycloalkynyl group, a C5 to C15 heterocycloalkyl group, or a combination including at least two of the foregoing.

Throughout the specification, the terms a and b of "Ca-Cb" used in formulae refer to the numbers of carbon atoms of a functional group. That is, the functional group may include from the number of a of carbon atoms to the number of b of carbon atoms. For example, "C1-C4 alkyl group" refers to an alkyl group having 1 to 4 carbon atoms, i.e., $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and $(CH_3)_3C$—.

The nomenclature for a particular substituent group can include a mono-radical or a di-radical. For example, if a substituent requires two bonds to other group(s) or compound(s), the substituent should be understood to be a di-radical. For example, a substituent characterized as an "alkyl group" requiring two bonds includes a di-radical alkylene group such as —$CH_2$, —$CH_2CH_2$—, and —$CH_2CH(CH_3)CH_2$—. In other words, an "alkyl group" means a monovalent alkyl group and/or an alkylene group. When the nomenclature for another radical group such as "alkylene group" is used, however, it indicates that the radical is a di-radical.

Throughout the specification, the term "alkyl group", and "alkylene group" used in formulae refers to a branched or unbranched aliphatic hydrocarbon group. The alkyl group may or may not be substituted. The alkyl group may include a methyl group, an ethyl group, a propyl group, an isopropyl group, a butyl group, an isobutyl group, a tert-butyl group, a pentyl group, a hexyl group, or the like, without being limited thereto, and these groups may or may not be substituted. The alkyl group may include 1 to 10 carbon atoms. For example, a C1-C10 alkyl group may be a methyl group, an ethyl group, a propyl group, an isopropyl group, a butyl group, an iso-butyl group, a sec-butyl group, a pentyl group, a 3-pentyl group, a hexyl group, or the like, without being limited thereto.

Throughout the specification, the term "cycloalkyl group" refers to a cyclic alkyl group having one or more saturated rings in which all ring members are carbon.

Throughout the specification, the term "alkylene group" used in formulae refers to a divalent alkyl group.

Throughout the specification, the term "aromatic" used in formulae refers to a ring or ring system having a conjugated pi electron system and includes a carbocyclic aromatic group (e.g., phenyl group) and a heterocyclic aromatic group (e.g., pyridine). If the whole ring system is aromatic, the term includes a monocyclic ring or a fused polycyclic ring (i.e., a ring that share adjacent pairs of atoms).

Throughout the specification, the term "aryl group" used in formulae refers to an aromatic ring in which a ring skeleton includes only carbon atoms, a ring system (i.e., two or more fused rings sharing two adjacent carbon atoms), or a plurality of aromatic rings linked to each other via a single bond, —O—, —S—, —C(=O)—, —S(=O)$_2$—, —Si($R_a$)($R_b$)— (where $R_a$ and $R_b$ are each independently a C1-C10 alkyl group), a C1-C10 alkylene group unsubstituted or substituted with a halogen atom, or —C(=O)—NH—. If the aryl group is a ring system, each ring is aromatic in the system. For example, the aryl group may be a phenyl group, a biphenyl group, a naphthyl group, a phenanthrenyl group, a naphthacenyl group, or the like, without being limited thereto. The aryl group may or may not be substituted.

Throughout the specification, the term "arylene group" used in formulae refers to an aryl group requiring at least two binding sites. A tetravalent arylene group is an aryl group requiring four binding sites and a divalent arylene group is an aryl group requiring two binding sites. For example, the arylene group may be —$C_6H_5$—O—$C_6H_5$—, or the like.

Throughout the specification, the term "heteroaryl group" used in formulae refers to an aromatic ring system including one ring, a plurality of fused rings, or a plurality of rings linked to each other via a single bond, —O—, —S—, —C(=O)—, —S(=O)$_2$—, —Si($R_a$)($R_b$)— (where $R_a$ and $R_b$ are each independently a C1-C10 alkyl group), a C1-C10 alkylene group unsubstituted or substituted with a halogen atom, or —C(=O)—NH—, in which at least one member in the aromatic ring is a heteroatom. In the fused ring system, at least one heteroatom may be included in only one ring. For example, the heteroatom may include oxygen, sulfur, and/or nitrogen as ring forming elements, without being limited thereto. For example, the heteroaryl group may be a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, an indolyl group, or the like, without being limited thereto.

Throughout the specification, the term "heteroarylene group" used in formulae refers to a heteroaryl group requiring at least two bonding sites. A tetravalent heteroarylene group is a heteroaryl group requiring four binding sites and a divalent heteroarylene group is a heteroaryl group requiring two binding sites.

Throughout the specification, the term "arylalkyl" refers to an alkyl group substituted with an aryl group. The term "heteroarylalkyl" refers to an alkyl group substituted with a heteroaryl group.

Throughout the specification, the term "halogen atom" used in formulae refers to a stable element belonging to Group 17 of the Periodic Table of the Elements, for example, fluorine, chlorine, bromine, or iodine, and for example, fluorine and/or chlorine.

An asterisk (i.e., "*") denotes a point of attachment, e.g., a position linked to the same or different atom or chemical formula.

Hereinafter, a binder, an electrode, and a lithium battery including the same, and a method of preparing the binder will be described in detail with reference to the accompanying drawings.

Polyimide binders are widely used as substances providing excellent mechanical properties, chemical resistance, and heat resistance to electrode plates. However, it is often difficult to use polyimide binders for industrial applications due to low long-term stability caused by difficulty in curing at low temperature, often resulting in formation of instable bonds inside an electrode active material layer, low initial efficiency caused by irreversibility of lithium ions, and water insolubility.

A binder according to an embodiment may include a cross-linked product of at least components A, B, and C below, wherein the cross-linked product is cross-linked by at least two ester bonds:

A. a first polymer that includes polyimide, polyamic acid, a copolymer thereof, or a combination thereof, wherein the first polymer comprises a structural unit including an alkali metal and at least one hydroxyl functional group, wherein the alkali metal and the hydroxyl functional groups can be in the same or different structural units;

B. a second polymer that includes poly(acrylic acid), poly(methacrylic acid), a copolymer thereof, or a combination thereof; and C. a third polymer that includes polyvinyl alcohol, polyacrylamide, polymethacrylamide, a copolymer thereof, or a combination thereof.

The binder may include the first polymer, the second polymer, and the third polymer. The first polymer may be polyimide, polyamic acid, a copolymer thereof, or a combination thereof, wherein the first polymer includes a structural unit having an alkali metal and a structural unit including at least one hydroxyl functional group. The alkali metal and the at least one hydroxyl functional group can be in different structural units or the same structural unit. The second polymer may be poly(acrylic acid), poly(methacrylic acid), a copolymer thereof, or a combination thereof. The third polymer may be polyvinyl alcohol, polyacrylamide, polymethacrylamide, a copolymer thereof, or a combination thereof.

The binder may include a cross-linked product of the first polymer, the second polymer, and the third polymer, wherein the cross-linked product is cross-linked by at least two ester bonds. In some embodiments, the binder may further include an amide bond between the polymers. The cross-linked product may be a product in which at least a portion of the functional groups included in the first polymer, the second polymer, and/or the third polymer are chemically cross-linked to one another.

Although charge and discharge characteristics of a battery such as initial efficiency and lifespan characteristics may be improved by adding the third polymer separately to an electrode slurry as an electrode binder, the third polymer stabilizes while serving as a surfactant, thereby forming bubbles in the electrode slurry. Since the binder according to an embodiment includes the cross-linked product of the first polymer, the second polymer, and the third polymer and the cross-linked product is cross-linked by at least two ester bonds, formation of bubbles may be suppressed. Since an electrode and a lithium battery including the binder may include an electrode plate having a reduced degree of unevenness and excellent physical properties, initial efficiency, Coulombic efficiency, discharge capacity, and capacity retention of the electrode and the lithium battery may be improved.

FIG. 1 is a schematic view of a cross-linked product 4 of a binder. As shown in FIG. 1, a first polymer 1 is cross-linked with a second polymer 2 via a first ester bond formed during reaction between a hydroxyl functional group of the structural unit of polyimide, polyamic acid, or a combination thereof of the first polymer 1 and a carboxyl functional group of the second polymer 2. The second polymer 2 is cross-linked with a third polymer 3 via a second ester bond formed during reaction between a carboxyl functional group of the second polymer 2 and a hydroxyl group or an amide group of the third polymer 3. Thus, the binder may include the cross-linked product 4 including at least two ester bonds or at least one ester bond and at least one amide bond.

The first polymer may include an alkali metal such as lithium, sodium, or the like, or a combination thereof. In the first polymer, for example, when the first polymer includes polyamic acid, the hydrogen of one or more of the carboxyl groups (carboxylic acid groups) bonded to a tetravalent aromatic group included in polyamic acid may be substituted with an alkali metal. In another embodiment, an alkali metal cation may be coordinated to a carbonyl group of one or more of the imide groups in the polyimide of a first polymer. In still another embodiment, an alkali metal cation may be coordinated to one or more amide groups of the polyamic acid in a first polymer. The first polymer may enhance curing properties at low temperature by performing pre-lithiation with the alkali metal and also may provide water soluble properties to the binder.

An amount of the alkali metal may be from about 0.2 to about 1 equivalent (eq.) with respect to a total amount of carboxyl groups, amide groups, and carbonyl groups of the first polymer. The amount of the alkali metal may be from about 0.3 to about 1 eq., for example, from about 0.4 to about 1 eq., and for example, from about 0.5 to about 1 eq. with respect to the total amount of the carboxyl groups, amide groups, and the carbonyl groups of the first polymer. When the amount of the alkali metal is within these ranges, an electrode and a lithium battery including the binder may have improved initial efficiency and Coulombic efficiency due to reduced irreversibility of lithium ions and enhanced lifespan characteristics due to stable bonds in the electrode slurry.

In an embodiment, the first polymer may include a structural unit represented by Formula 1 below, Formula 2 below, or a combination thereof.

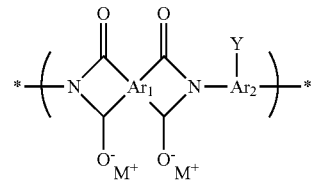

Formula 1

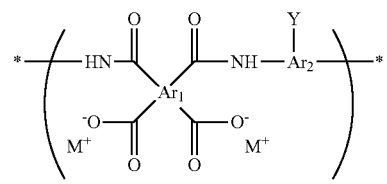

Formula 2

In Formulae 1 and 2, each $Ar_1$ may be an aromatic ring group of a substituted or unsubstituted tetravalent C6-C24 arylene group, a substituted or unsubstituted tetravalent C6-C24 heteroarylene group, or a combination thereof, $Ar_2$ may be an aromatic ring group of a substituted or unsubstituted C6-C24 arylene group, a substituted or unsubstituted C6-C24 heteroarylene group, or a combination thereof, each of the aromatic ring groups independently may be a single aromatic ring, a group in which two or more aromatic rings are condensed, or a group in which the two or more aromatic rings are linked to each other via a single bond, —O—, —S—, —C(═O)—, —S(═O)$_2$—, —Si($R_a$)($R_b$)— where $R_a$ and $R_b$ are each independently a C1-C10 alkyl group, a C1-C10 alkylene group unsubstituted or substituted with a halogen atom, or —C(═O)═NH—, M may be an alkali metal, Y may be —OH, and * may be a binding site to an adjacent atom.

For convenience herein, the aryl groups $Ar_1$ are represented in their non-salt form. In particular, as would be understood by a person of ordinary skill in the art, the actual structure of the alkali metal salt of a polyimide of Formula 1 would depend on the group $Ar_1$. For example, when M is lithium and $Ar_1$ is phenyl, the actual structure of the polyimide unit may be represented by Formula 1a:

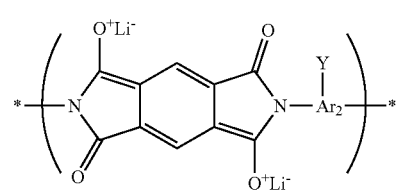

Formula 1a

Since the first polymer includes an alkali metal, an electrode and a lithium battery including a binder having the same may have excellent initial efficiency, Coulombic efficiency, discharge capacity, and lifespan characteristics. Since the first polymer includes a hydroxyl (—OH) functional group which reacts with a carboxyl group of the second polymer forming a cross-linked product via an ester bond, an amount of the third polymer may be reduced in the binder. Without being bound by theory, the first polymer improves adhesion and cohesion between an electrode current collector and an electrode active material or inside the electrode active material, and thus mechanical properties of an electrode plate including a binder having the same may be improved.
For example, $Ar_1$ of Formulae 1 and 2 above may include a residue having a structural unit of a formula of Group 1 below.
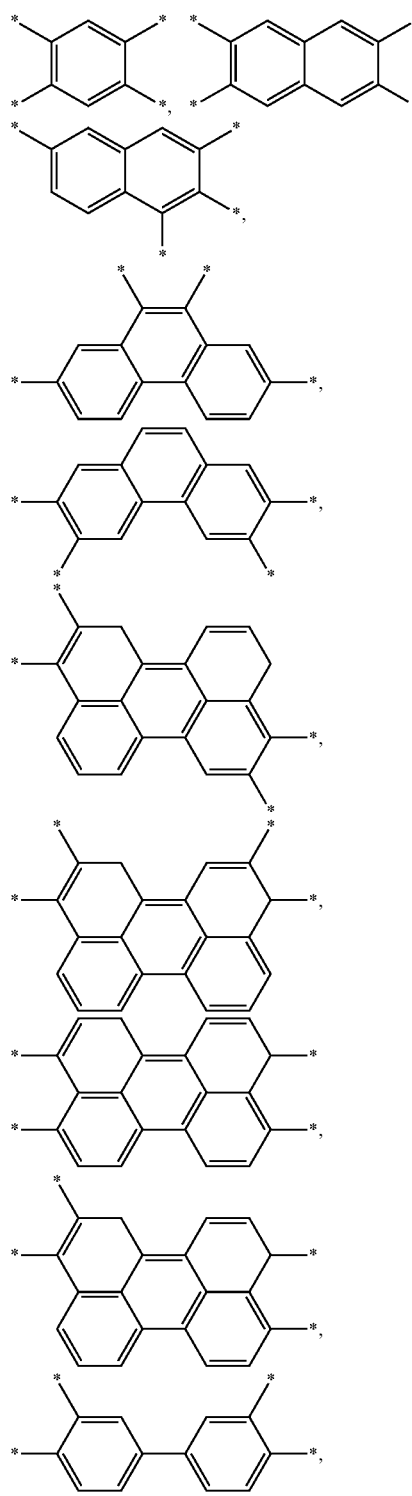
Group 1
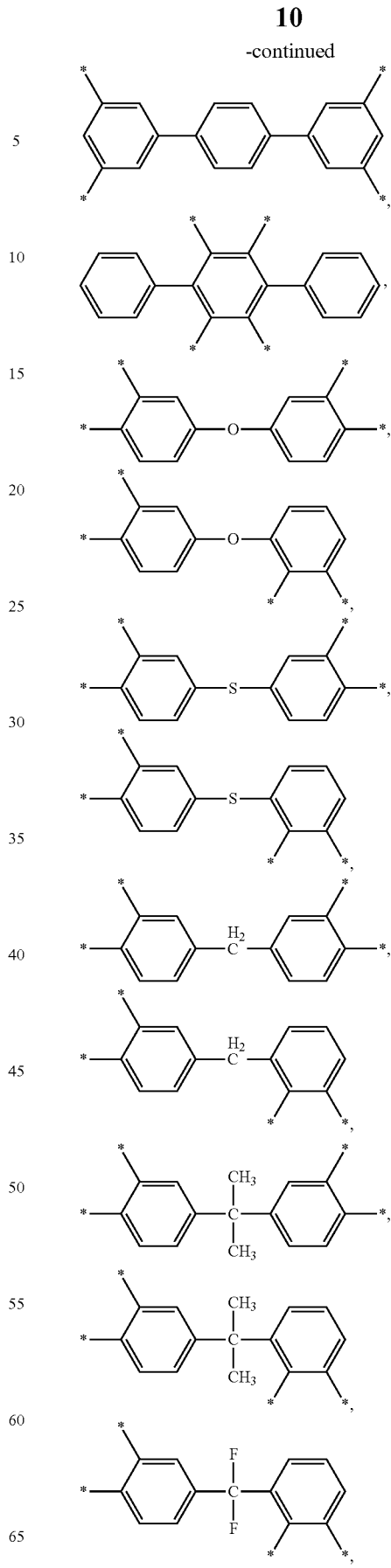
-continued

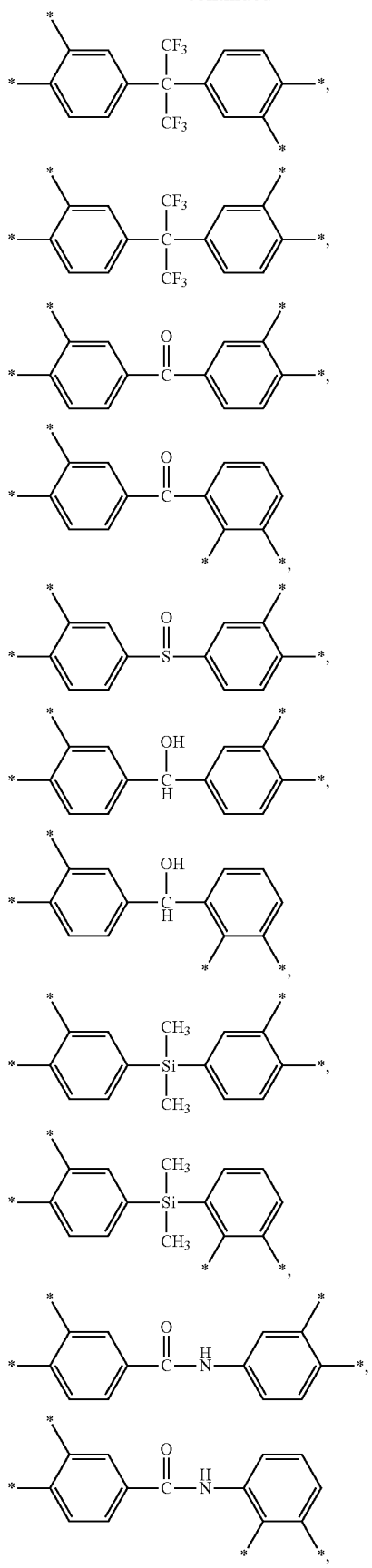
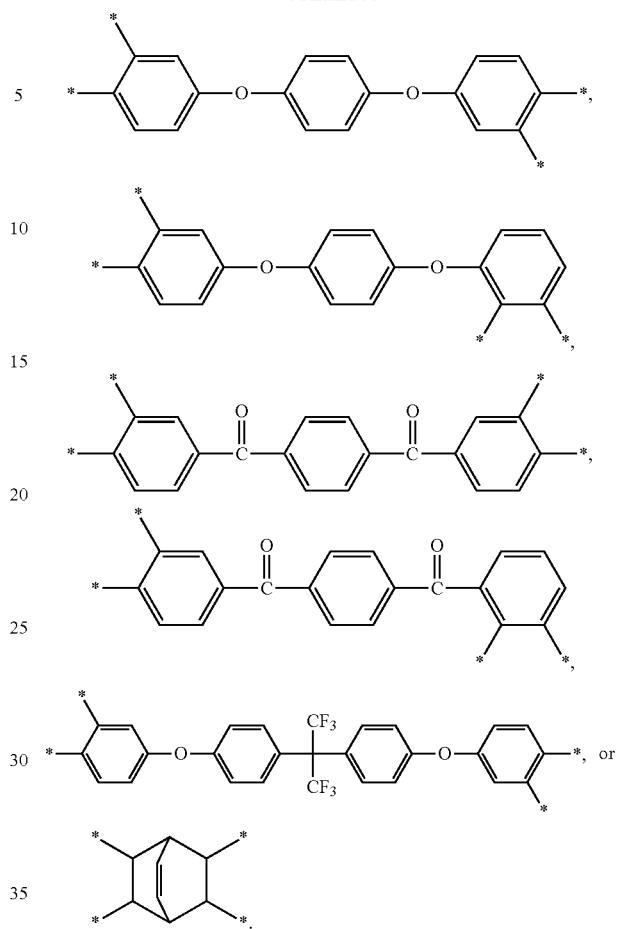
In the formulae of Group 1, each residue may be substituted or unsubstituted, and * may be a binding site to an adjacent atom.
For example, Ar$_2$ of Formulae 1 and 2 above may include a residue having a structural unit of a formula of Group 2 below.
Group 2
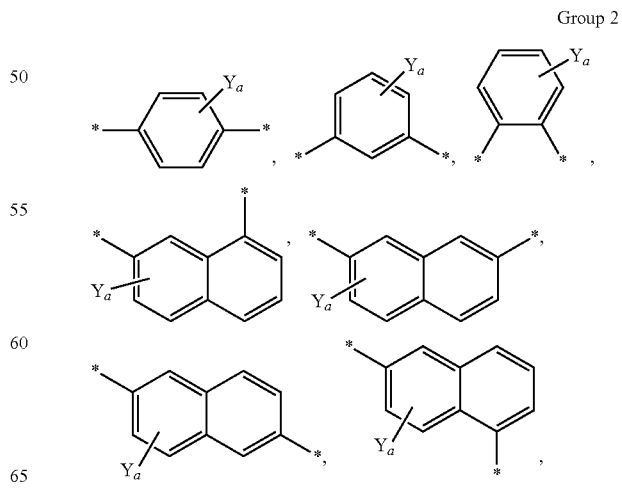

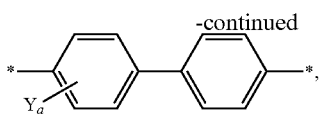

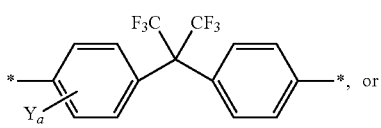

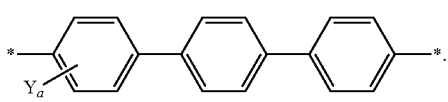

In the formulae of Group 2, each residue may be a substituted or unsubstituted residue, $Y_a$ is —OH, and * may be a binding site to an adjacent atom.

In an embodiment, an amount of the structural unit represented by Formula 1, Formula 2, or a combination thereof in the first polymer may be 20% by weight or greater based on a total weight of the first polymer. In another embodiment, the amount of the structural unit may be from about 20% by weight to about 99.9% by weight, for example, from about 25% by weight to about 90% by weight, for example, from about 25% by weight to about 80% by weight, for example, from about 25% by weight to about 75% by weight, based on a total weight of the first polymer. When the amount of the structural unit is within these ranges, an electrode plate including a binder having the same may have excellent mechanical properties. A lithium battery including the electrode may have excellent initial efficiency, Coulombic efficiency, discharge capacity, and lifespan characteristics.

For example, the first polymer may be represented by Formula 3 below, Formula 4 below, or a combination thereof.

In Formulae 3 and 4, each occurrence of $Ar_3$ and $Ar_4$ may be the same or different, and each may be independently an aromatic ring group of a substituted or unsubstituted C6-C24 arylene group, a substituted or unsubstituted C6-C24 heteroarylene group, or a combination thereof, the aromatic ring group may be is a single aromatic ring, a group in which two or more aromatic rings are condensed, or a group in which the two or more aromatic rings are linked to each other via a single bond, —O—, —S—, —C(=O)—, —S(=O)$_2$—, —Si($R_a$)($R_b$)— (where $R_a$ and $R_b$ are each independently a C1-C10 alkyl group), a C1-C10 alkylene group unsubstituted or substituted with a halogen atom, or —C(=O)=NH—, each M may be the same or different, and may be lithium or sodium, each $Y_1$ may be the same or different, and may be a hydrogen atom, a halogen atom, —COOH, —OH, —CHO, —C(=O)NH$_2$, a substituted or unsubstituted C1-C10 alkyl group, a C6-C20 aryl group unsubstituted or substituted with a halogen atom, or a C2-C20 heteroaryl group unsubstituted or substituted with a halogen atom, or a combination thereof, each $Y_2$ may be the same or different, and may be —OH, and n and m may be mole fractions in repeating units, wherein n and m for Formulae 3 and 4 are each independently 0<n<1, 0<m<1, and n+m=1.

For example, the first polymer may be represented by Formula 5 below, Formula 6 below, or a combination thereof.

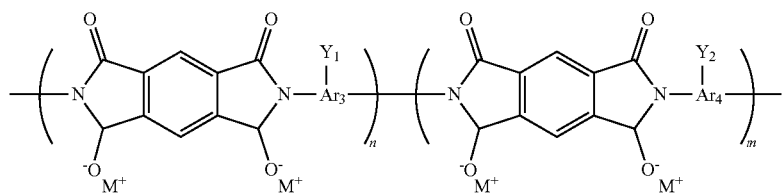

Formula 3

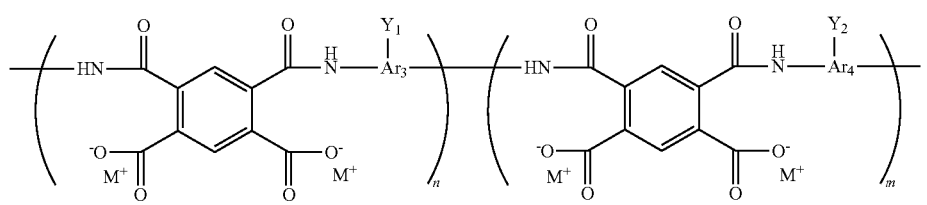

Formula 4

Formula 5

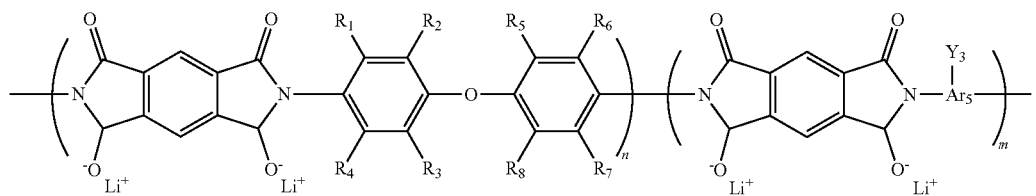

Formula 6

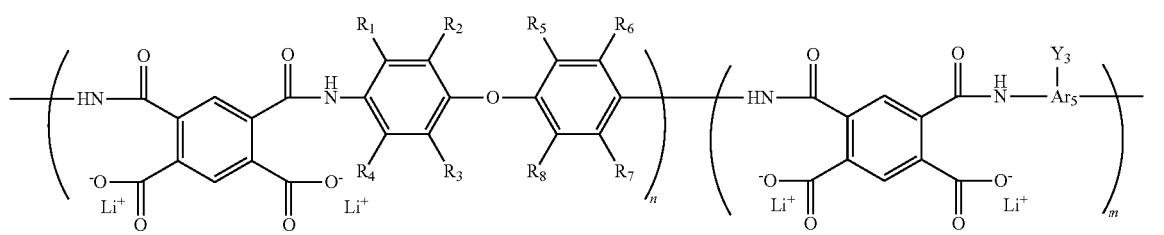

In Formulae 5 and 6, each $R_1$, $R_2$, $R_3$, $R_4$, $R_5$, $R_6$, $R_7$, and $R_8$ may be the same or different, and each may be independently a hydrogen atom, a halogen atom, —COOH, —OH, —CHO, —C(=O)NH$_2$, a substituted or unsubstituted C1-C10 alkyl group, a C6-C20 aryl group unsubstituted or substituted with a halogen atom, or a C2-C20 heteroaryl group unsubstituted or substituted with a halogen atom, or a combination thereof, each $Ar_5$ may be the same or different, and may be an aromatic ring group of a substituted or unsubstituted divalent C6-C24 arylene group, a substituted or unsubstituted divalent C6-C24 heteroarylene group, or a combination thereof, the aromatic ring group may be a single aromatic ring, a group in which two or more aromatic rings are condensed, or a group in which the two or more aromatic rings are linked to each other via a single bond, —O—, —S—, —C(=O)—, —S(=O)$_2$—, —Si($R_a$)($R_b$)— (where $R_a$ and $R_b$ are each independently a C1-C10 alkyl group), a C1-C10 alkylene group unsubstituted or substituted with a halogen atom, or —C(=O)=NH—, each $Y_3$ may be the same or different, and may be —OH, and n and m may be mole fractions in repeating units, wherein in and m in Formulae 5 and 6 are each independently 0<n<1, 0<m<1, and n+m=1.

For example, $Ar_5$ of Formulae 5 and 6 above may include a residue having a structural unit of a formula of Group 3 below.

Group 3

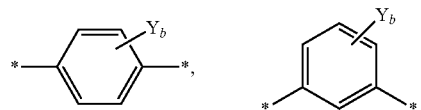

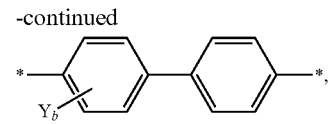

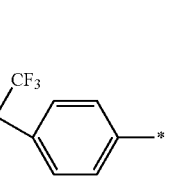

In the formulae of Group 3, each residue may be a substituted or unsubstituted residue, $Y_b$ is —OH, and * may be a binding site to an adjacent atom.

In an embodiment, in the first polymer represented by Formula 5 or Formula 6, 0.2<n<0.8, 0.2<m<0.8, and n+m=1. When mole fractions n and m are within the ranges above in the first polymer, an electrode plate including a binder having the same may have excellent physical properties and a lithium battery including the electrode may have excellent initial efficiency, Coulombic efficiency, discharge capacity, and lifespan characteristics.

For example, the first polymer may be represented by Formula 7 below, Formula 8 below, Formula 9 below, Formula 10 below, or a combination thereof.

Formula 7

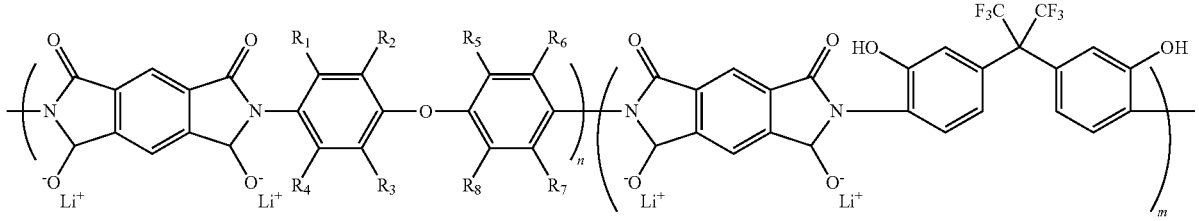

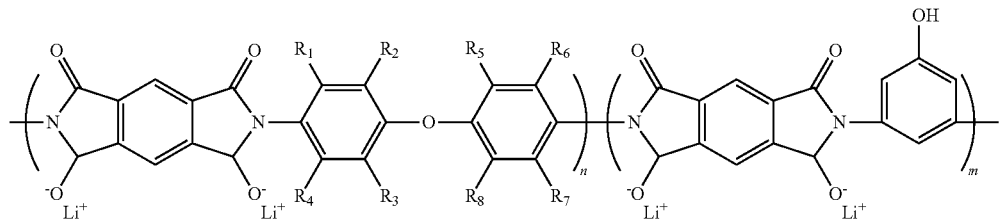

Formula 8

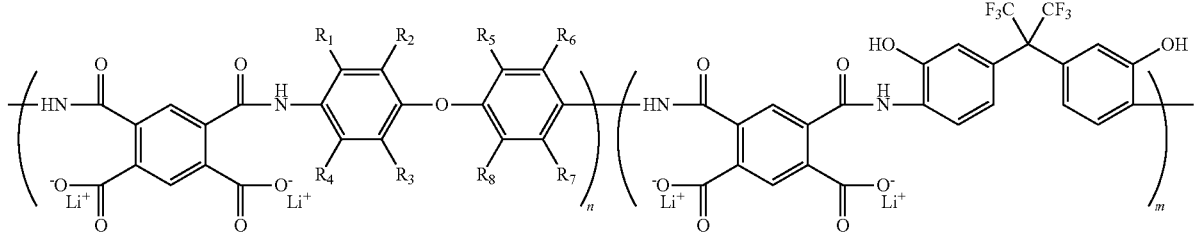

Formula 9

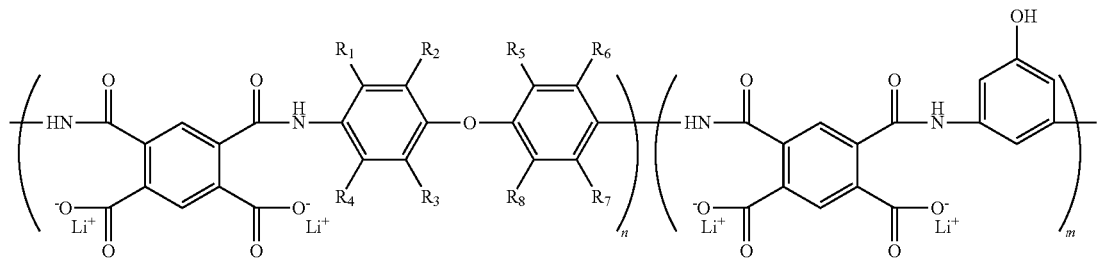

Formula 10

In Formulae 7, 8, 9, and 10, each $R_1$, $R_2$, $R_3$, $R_4$, $R_5$, $R_6$, $R_7$, and $R_8$ may be the same or different, and each may be independently a hydrogen atom, a halogen atom, —COOH, —OH, —CHO, —C(=O)NH$_2$, a substituted or unsubstituted C1-C10 alkyl group, a C6-C20 aryl group unsubstituted or substituted with a halogen atom, or a C2-C20 heteroaryl group unsubstituted or substituted with a halogen atom, or a combination thereof, and n and m may be mole fractions in repeating units, wherein n and m in Formulae 7, 8, 9, and 10 are each independently 0<n<1, 0<m<1, and n+m=1.

In an embodiment, the first polymer represented by Formulae 3 to 10 above may be a random copolymer or a block copolymer.

The first polymer may have a weight average molecular weight of about 10,000 to about 1,500,000 Dalton (Da). For example, the first polymer may have a weight average molecular weight of about 10,000 to about 1,400,000 Da, for example, about 10,000 to about 1,300,000 Da, for example, about 50,000 to about 1,200,000 Da, for example, about 70,000 to about 1,100,000 Da, for example, about 80,000 to about 1,000,000 Da, for example, about 90,000 to about 1,000,000 Da, and for example, about 100,000 to about 1,000,000 Da. When the weight average molecular weight of the first polymer is within these ranges, physical properties of an electrode plate including a binder having the same may further be improved.

The weight average molecular weight of the first polymer is measured by Gel Permeation Chromatography (GPC) with respect to a polystyrene standard sample.

The second polymer may be poly(acrylic acid), poly (methacrylic acid), a copolymer thereof, or a combination thereof. The second polymer may be a polymerization product of an acrylic monomer, a methacrylic monomer, a hydrolysate thereof, or a combination thereof. For example, the second polymer may be poly(acrylic acid). Poly(acrylic acid) may have a weight average molecular weight of about 10,000 to about 1,000,000 Da, for example, about 50,000 to about 1,000,000 Da, for example, about 60,000 to about 900,000 Da, for example, about 70,000 to about 800,000 Da, for example, about 80,000 to about 700,000 Da, for example, about 90,000 to about 600,000 Da, and for example, about 100,000 to about 500,000 Da. When the weight average molecular weight of the second polymer is within these ranges above, physical properties of an electrode plate including a binder having the same may further be improved. The weight average molecular weight of the second polymer is measured by GPC with respect to a polystyrene standard sample.

The second polymer may further include a structural unit comprising an alkali metal such as lithium, sodium, or a combination thereof. When the second polymer is bonded to a silicon electrode active material with a large volume expansion and shrinkage, cohesion may be improved. If the binder includes an appropriate amount of the second polymer, foam formation may be suppressed in an electrode slurry and physical properties of an electrode plate including the binder may be improved. A lithium battery including the electrode may have excellent discharge capacity and lifespan characteristics.

In an embodiment, an amount of the alkali metal may be from about 0.2 to about 1 eq. to a total amount of carboxyl groups and amide groups of the first polymer. The amount of the alkali metal may be from about 0.3 to about 1 eq., for example, from about 0.4 to about 1 eq., and for example, from about 0.5 to about 1 eq. to the total amount of carboxyl groups and amide groups of the first polymer. When the amount of the alkali metal is within the ranges above, physical properties of an electrode plate including the same may further be improved simultaneously reducing influence thereof in cross-linking inside the binder, and thus discharge capacity and lifespan characteristics of a lithium battery including the electrode may further be improved.

The third polymer includes polyvinyl alcohol, polyacrylamide, polymethacrylamide, a copolymer thereof, or a combination thereof. For example, the third polymer may be polyvinyl alcohol (PVA). For example, polyvinyl alcohol may be a hydrolysate obtained by hydrolyzing polyvinyl acetate with an alkali.

A saponification ratio of polyvinyl alcohol may be 90% or greater. For example, the saponification ratio of polyvinyl alcohol may be 92% or greater, for example, 94% or greater, for example, 95% or greater, for example, 96% or greater, for example, 97% or greater, and for example, 98% or greater. When the saponification ratio of polyvinyl alcohol is within these ranges above, formation of bubbles may further be suppressed in an electrode slurry including the same and thus surface roughness of an electrode plate may be reduced.

Polyvinyl alcohol may have a weight average molecular weight of about 10,000 to about 500,000 Da. Polyvinyl alcohol may have a weight average molecular weight of about 50,000 to about 450,000 Da, for example, about 60,000 to about 400,000 Da, for example, about 70,000 to about 350,000 Da, for example, about 80,000 to about 300,000 Da, for example, about 90,000 to about 300,000 Da, and for example, about 100,000 to about 300,000 Da. When the weight average molecular weight of polyvinyl alcohol is within these ranges above, physical properties of an electrode plate including a binder having the same may further be improved. The weight average molecular weight of polyvinyl alcohol is measured by GPC with respect to a polystyrene standard sample.

An amount of the first polymer in the binder may be in the range of about 3% by weight to about 30% by weight based on a total weight of the cross-linked product. For example, the amount of the first polymer may be in the range of about 5% by weight to about 28% by weight, for example, about 5% by weight to about 25% by weight, and for example, about 5% by weight to about 20% by weight based on a total weight of the cross-linked product.

An amount of the second polymer in the binder may be in the range of about 10% by weight to about 92% by weight based on a total weight of the cross-linked product. For example, the amount of the second polymer may be in the range of about 12% by weight to about 85% by weight, for example, about 15% by weight to about 80% by weight, and for example, about 20% by weight to about 75% by weight based on a total weight of the cross-linked product.

An amount of the third polymer in the binder may be in the range of about 5% by weight to about 60% by weight based on a total weight of the cross-linked product. For example, the amount of the third polymer may be in the range of about 10% by weight to about 60% by weight, for example, about 15% by weight to about 60% by weight, and for example, about 20% by weight to about 60% by weight based on a total weight of the cross-linked product.

For example, a weight ratio of the first polymer, the second polymer, and the third polymer may be in the range of 20:20:60 to 20:60:20. For example, the weight ratio may be in the range of 20:20:60 to 20:40:40. When the weight ratio is within these ranges above, formation of bubbles caused by the binder may further be suppressed. Thus, physical properties of an electrode plate including the binder may further be improved and charge and discharge characteristics, such as initial efficiency, Coulombic efficiency, discharge capacity, and lifespan characteristics, of a lithium battery including the same may further be improved.

The binder may further include an antifoaming agent. The antifoaming agent may be an antifoaming agent capable of suppressing formation of bubbles caused by polyvinyl alcohol in the binder. By using the antifoaming agent, surface roughness of an electrode plate may further be reduced and physical properties of the electrode plate may further be improved. Thus, initial efficiency, Coulombic efficiency, discharge capacity, and capacity retention of a lithium battery may further be improved.

The cross-linked product may have a weight average molecular weight of about 10,000 to about 2,000,000 Da. The cross-linked product may have a weight average molecular weight of about 50,000 to about 2,000,000 Da, and for example, about 100,000 to about 2,000,000 Da.

An electrode according to another embodiment may include the binder described above and a positive active material or a negative active material. For example, the electrode may be a positive electrode including the binder and the positive active material. For example, the electrode may be a negative electrode including the binder and the negative active material.

The negative electrode may include at least one negative active material that is lithium metal, a metal or semi-metal alloyable with lithium, a transition metal oxide, a non-transition metal oxide, and a carbonaceous material.

For example, the metal or semi-metal alloyable with lithium may include Si, Sn, Al, Ge, Pb, Bi, Sb, Si-Y' alloy (where Y' is alkali metal, alkali earth metal, Group 13 elements to Group 16 elements, transition metal, rare earth elements, or any combination thereof (except for Si), or Sn—Y' alloy (where Y' is alkali metal, alkali earth metal, Group 13 elements to Group 16 elements, transition metal, rare earth elements, or any combination thereof (except for Sn). The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or any combination thereof.

For example, the transition metal oxide may be lithium titanium oxide, vanadium oxide, lithium vanadium oxide, or the like.

For example, the non-transition metal oxide may be $SnO_2$, $SiO_x$ ($0<x<2$), or the like.

The carbonaceous material may include crystalline carbon, amorphous carbon, or any mixture thereof. The crystalline carbon may be natural graphite or artificial graphite which is in a shapeless, plate, flake, spherical or fibrous form. The amorphous carbon may be soft carbon (carbon sintered at low temperatures), hard carbon, meso-phase pitch carbonization products, sintered coke, or the like.

For example, the negative electrode may include at least one of a silicon active material, a tin active material, a silicon-tin alloy active material, and a silicon-carbon active material.

The surface of the electrode may have an average roughness Ra of 3 µm or less. The surface average roughness Ra of the electrode may be 2.9 µm or less, for example, 2.8 µm or less, for example, 2.7 µm or less, for example, 2.6 µm or less, and for example 2.5 µm or less. When the surface average roughness Ra is within these ranges above, the electrode may have a smooth surface. Thus, formation of bubbles may be suppressed during preparation of an electrode slurry, and thus processibility may be improved and charge and discharge characteristics, such as initial efficiency, Coulombic efficiency, lifespan characteristics, of a lithium battery may be improved even when used with an electrode active material with a large volume expansion and shrinkage.

The electrode may have a cohesion of 100 grams force per centimeter (gf/cm) or greater between the positive active material and the binder, between the negative active material and the binder, or between adjacent binders. When the electrode has a cohesion of 100 gf/cm or greater, physical properties of an electrode plate may be improved. Thus, charge and discharge characteristics, such as initial efficiency, Coulombic efficiency, discharge capacity, and lifespan characteristics, of a lithium battery including the electrode may be improved.

The negative electrode may be prepared, for example, by preparing a negative active material composition by mixing a negative active material, a conductive agent, the above-described binder, and a solvent, and then directly coating the composition on a current collector such as a copper foil to prepare a negative electrode plate. Alternatively, the negative active material composition may be cast on a separate support and a negative active material film separated from the support may be laminated on a current collector such as a copper foil to prepare a negative electrode plate.

In another embodiment, a negative electrode including the binder having a cross-linked product of the first polymer, the second polymer, and the third polymer may be prepared by preparing a negative active material composition including a negative active material, a conductive agent, a solvent, and the first polymer, the second polymer, and the third polymer, and coating the composition on a current collector, and heat-treating the resultant at 150° C. or greater to perform cross-linking polymerization. Alternatively, the negative active material composition may be cast on a separate support and heat-treated at 150° C. or greater to perform cross-linking polymerization, and a negative active material film including a binder having a cross-linked product obtained therefrom may be separated from the support and laminated on a current collector such as a copper film to prepare a negative electrode plate. The negative electrode is not limited to those described above and may also be any other type.

The conductive agent may be acetylene black, Ketjen black, natural graphite, artificial graphite, carbon black, carbon fiber, metal such as copper, nickel, aluminum, and silver which is used in powder or fiber form, conductive polymer such as polyphenylene derivatives, or any mixture thereof. However, the conductive agent is not limited thereto and any other materials commonly used in the art as conductive materials may also be used therefor. In addition, a crystalline carbonaceous material may be added as a conductive agent.

In addition to the aforementioned binder including the cross-linked product, a vinylidene fluoride/hexafluoropropylene copolymer, polyvinylidene difluoride (PVDF), polyacrylonitrile, polymethylmethacrylate, polytetrafluoroethylene (PTFE) and a mixture thereof, and a styrene butadiene rubber polymer may further be used as the binder. However, examples of the binder are not limited thereto and any other binders commonly used in the art may also be used therefor.

The solvent may be N-methylpyrrolidone (NMP), acetone, water, or the like. However, the solvent is not limited thereto and any solvent commonly used in the art may also be used therefor.

The negative active material, the conductive agent, the binder, and the solvent may be used in amounts commonly used in lithium batteries. At least one of the conductive agent and the solvent may be omitted according to the use and the structure of the lithium battery.

The positive electrode may be prepared in the same manner as in the preparation of the negative electrode except that a positive active material is used instead of the negative active material. In addition, a conductive agent, a binder, and a solvent used to prepare a positive active material composition may be the same as those used in the preparation of the negative electrode.

For example, a positive electrode plate may be prepared by preparing a positive active material composition by mixing the positive active material, the conductive agent, the binder, and the solvent, and then directly coating the composition on an Al current collector. Alternatively, the positive active material composition may be cast on a separate support and a positive active material film separated from the support may be laminated on an aluminum current collector to prepare a positive electrode plate.

In another embodiment, a positive electrode including the binder having a cross-linked product of the first polymer, the second polymer, and the third polymer may be prepared by preparing a positive active material composition including a positive active material, a conductive agent, a solvent, and the first polymer, the second polymer, and the third polymer, and coating the composition on a current collector, and heat-treating the resultant at 150° C. or greater to perform cross-linking polymerization. Alternatively, the positive active material composition may be cast on a separate support and heat-treated at 150° C. or greater to perform cross-linking polymerization, and a positive active material film including a binder of a cross-linked product obtained therefrom may be separated from the support and laminated on a copper current collector to prepare a positive electrode plate. The positive electrode is not limited to those described above and may also be any other type.

The positive active material may include at least one of lithium cobalt oxide, lithium nickel cobalt manganese oxide, lithium nickel cobalt aluminum oxide, lithium iron phosphate, and lithium manganese oxide, without being limited thereto. In addition, any positive active material commonly used in the art may also be used.

For example, the positive active material may be a compound represented by one of the following formulae: $Li_aA_{1-b}B'_bD'_2$ (where $0.90 \le a \le 1.8$ and $0 \le b \le 0.5$); $Li_aE_{1-b}B'_bO_{2-c}D'_c$ (where $0.90 \le a \le 1.8$, $0 \le b \le 0.5$, and $0 \le c \le 0.05$); $LiE_{2-b}B'_bO_{4-c}D'_c$ (where $0 \le b \le 0.5$ and $0 \le c \le 0.05$); $Li_aNi_{1-b-c}Co_bB'_cD'_\alpha$ (where $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F'_\alpha$ (where $0.90 \le a \le 1.8$, $0 \le b \le 0.5$, $0 \le c \le 0.05$, and $0 < \alpha < 2$); $Li_aNi_{1-b-c}CO_bB'_cO_{2-\alpha}F'_2$ (where $0.90 \le a \le 1.8$, $0 \le b \le 0.5$, $0 \le c \le 0.05$, and $0 < \alpha < 2$); $Li_aNi_{1-b-c}Mn_bB'_cD'_\alpha$ (where $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F'_\alpha$ (where $0.90 \le a \le 1.8$, $0 \le b \le 0.5$, $0 \le c \le 0.05$, and $0 < \alpha < 2$); $Li_aNi_{1-b-c}Mn_bB'_cO_{2-\alpha}F'_2$ (where $0.90 \le a \le 1.8$, $0 \le b \le 0.05$, $0 \le c \le 0.05$ and $0 < \alpha < 2$); $Li_aNi_bE_cG_dO_2$ (where $0.90 \le a \le 1.8$, $0 \le b \le 0.9$, $0 \le c \le 0.5$ and $0.001 \le d \le 0.1$); $Li_aNi_bCo_cMn_dG_eO_2$ (where $0.90 \le a \le 1.8$, $0 \le b \le 0.9 0 \le c \le 0.5$, $0 \le d \le 0.5$, and $0.001 \le e \le 0.1$); $Li_aNiG_bO_2$ (where $0.90 \le a \le 1.8$ and $0.001 \le b \le 1$); $Li_aCoG_bO_2$ (where $0.90 \le a \le 1.8$ and $0.001 \le b \le 0.1$); $Li_aMnG_bO_2$ (where $0.90 \le a \le 1.8$ and $0.001 \le b \le 0.1$); $Li_aMn_2G_4$ (where $0.90 \le a \le 1.8$ and $0.001 \le b \le 1$); $QO_2$; $QS_2$; $LiQS_2$; $V_2O_5$; $LiV_2O_5$; $LiI'O_2$; $LiNiVO_4$; $Li_{(3-f)}J'_2(PO_4)_3$ ($0 \le f \le 2$); $Li_{(3-0)}Fe_2(PO_4)_3$ ($0 \le f \le 2$); or $LiFePO_4$.

In the formulae above, A is nickel (Ni), cobalt (Co), manganese (Mn), or any combination thereof; B' is aluminum (Al), nickel (Ni), cobalt (Co), manganese (Mn), chromium (Cr), iron (Fe), magnesium (Mg), strontium (Sr), vanadium (V), a rare earth element, or any combination thereof; D' is oxygen (O), fluorine (F), sulfur (S), phosphorus (P), or any combination thereof; E is cobalt (Co), manganese (Mn), or a combination thereof; F' is fluorine (F), sulfur (S), phosphorus (P), or any combination thereof; G is aluminum (Al), chromium (Cr), manganese (Mn), iron (Fe), magnesium (Mg), lanthanum (La), cerium (Ce), strontium (Sr), vanadium (V), or any combination thereof; Q is titanium (Ti), molybdenum (Mo), manganese (Mn), or any combination thereof; I' is chromium (Cr), vanadium (V), iron (Fe), scandium (Sc), yttrium (Y), or any combination thereof; and J is vanadium (V), chromium (Cr), manganese (Mn), cobalt (Co), nickel (Ni), copper (Cu), or any combination thereof.

The compounds listed above may have a coating layer on the surface thereof. Alternatively, a mixture of a compound with no coating layer and a compound having a coating layer, the compounds being selected from the compounds listed above, may be used. The coating layer may include a compound of a coating element, such as an oxide, hydroxide, oxyhydroxide, oxycarbonate, or hydroxycarbonate of the coating element. The compound constituting the coating layer may be amorphous or crystalline. Examples of the coating element contained in the coating layer may be Mg, Al, Co, K, Na, Ca, Si, Ti, V, Sn, Ge, Ga, B, As, Zr, or a mixture thereof. The coating layer may be formed on the compound by using any method, which does not adversely affect physical properties of the positive active material, for example, a spray coating method and an immersion method. These methods are obvious to those of skill in the art, and thus a detailed description thereof will not be given.

For example, $LiNiO_2$, $LiCoO_2$, $LiMn_xO_2$ (x=1 and 2), $LiNi_{1-x}Mn_xO_2$ (0<x<1), $LiNi_{1-x-y}Co_xMn_yO_2$ (0≤x≤0.5 and 0≤y≤0.5), $LiFePO_4$, or the like may be used.

A lithium battery according to another embodiment may include a first electrode; a second electrode; and an electrolyte disposed between the first electrode and the second electrode.

Figure 9:
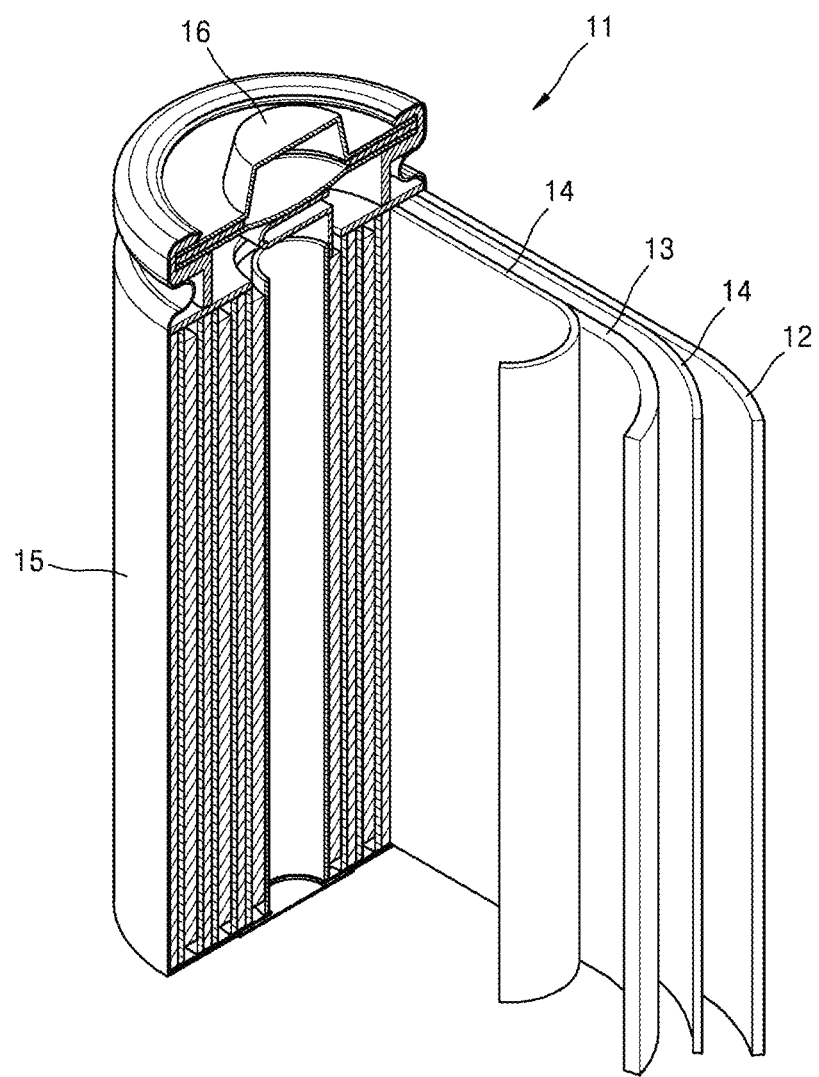
FIG. 9 is a schematic view of a lithium battery according to an embodiment.

FIG. 9 is a schematic diagram of a lithium battery 11 according to an exemplary embodiment. Referring to FIG. 9, the lithium battery 11 includes a positive electrode 13, a negative electrode 12, and a separator 14. The positive electrode 13, the negative electrode 12, and the separator 14 are wound or folded and then accommodated in a battery case 15. Next, an organic electrolyte is injected into the battery case 15 and the battery case 5 is sealed with a cap assembly 6, thereby completing the manufacture of the lithium battery 11. The battery case 15 may have a cylindrical shape, a rectangular shape, or a thin-film shape. For example, the lithium battery may be a lithium ion battery.

The separator 14 is disposed between the positive electrode 13 and the negative electrode 12 to form a battery assembly. The battery assembly is stacked in a bi-cell structure and impregnated with the organic electrolyte, and the resultant is inserted into a pouch and sealed, thereby completing preparation of a lithium ion polymer battery.

In addition, a plurality of battery assemblies may be stacked to form a battery pack which may be used in any device that requires high capacity and high output, for example, in laptop computers, smart phones, and electric vehicles.

The lithium battery having high rate properties and excellent lifespan characteristics is suitable for use as power sources of electric vehicles (EVs), for example, hybrid vehicles such as plug-in hybrid electric vehicles (PHEVs).

A method of preparing a binder according to another embodiment includes: mixing a first composition including a non-aqueous solvent and a first polymer including polyimide, polyamic acid, a copolymer thereof, or a combination thereof, wherein the first polymer includes a structural unit including an alkali metal and a structural unit including at least one hydroxyl functional group, which may be the same or different structural units, a second composition including water and a second polymer including poly(acrylic acid), poly(methacrylic acid), a copolymer thereof, or a combination thereof, and a third composition including water and a third polymer including polyvinyl alcohol, polyacrylamide, polymethacrylamide, a copolymer thereof, or a combination thereof to obtain a mixture; and heat-treating the mixture to prepare a cross-linked product and prepare the binder.

The first polymer, the second polymer, and the third polymer are the same as those described above, and thus detailed descriptions thereof will not be repeated. The non-aqueous solvent may be a polar solvent such as N-methylpyrrolidone (NMP) and alcohol. The first composition may further include water. The second composition and the third composition may further include a polar organic solvent such as alcohol that is blended with water in addition to an aqueous solution or water.

The heat-treating may be performed at a temperature of 150° C. or greater for about 1 hour to about 10 hours. When the heat-treating temperature and heat-treating time are within these ranges above, cross-linking may be sufficiently performed. In an embodiment, the heat-treating temperature may be lowered by additionally adding a separate cross-linking catalyst or cross-linking agent.

One or more exemplary embodiments will be described in more detail with reference to the following examples and comparative examples. However, these examples and comparative examples are exemplary and are not intended to limit the scope of the one or more exemplary embodiments of the present disclosure.

EXAMPLES

Example 1

Preparation of Binder (Weight Ratio of LiPI—OH:PAA:PVA=20:60:20 and Molar Ratio of PMDA:ODA:BisAPAF=4:3:1)

After a three-necked round bottom flask was filled with nitrogen, 6.4863 grams (g) (0.0324 moles (mol)) of 4,4'-oxydianiline (ODA) and 3.9519 g (0.0108 mol) of 2,2-bis (3-amino-4-hydroxyphenyl)hexafluoropropane (BisAPAF) were added thereto, and then 180 g of N-methylpyrrolidone (NMP) was added thereto. The mixture was completely dissolved by using a mechanical stirrer. Next, 9.5619 g (0.0438 mol) of pyromellitic dianhydride (PMDA) was added thereto and the flask was maintained at room temperature for 24 hours while stirring to prepare polyamic acid represented by Formula 11 below (PMDA/ODA/BisAPAF, acid equivalents: 225 grams per equivalent (g/eq.), weight average molecular weight Mw: about 500,000 Da). Polyamic acid is a random copolymer. A molar ratio of PMDA:ODA:BisAPAF was 4:3:1.

20.98 g (10% by weight, 1.0 eq. to carboxylic acid groups of the polyamic acid) of a LiOH aqueous solution was added to the polyamic acid represented by Formula 11 below (PMDA/ODA/BisAPAF), acid equivalents: 225 g/eq., weight average molecular weight Mw: about 500,000 Da) to prepare a polyamic acid represented by Formula 12 in which 1.0 eq. of the —COOH groups of the polyamic acid were substituted with lithium ions (i.e., as COO—Li⁺. Mole fractions n and m of repeating units of polyamic acid represented by Formulae 11 and 12 were 3:1.

Polyamic acid copolymer represented by Formula 12 below, poly(acrylic acid) (PAA) (weight average molecular weight Mw: 450,000 Da, Aldrich, 181285), and polyvinyl alcohol (PVA) (weight average molecular weight Mw: 89,000 Da, saponification ratio of 99% or greater, Aldrich, 341584) were heat-treated in a weight ratio of 20:60:20 in a vacuum oven at 180° C. for 2 hours to prepare a cross-linked polymer product. The cross-linked polymer product comprised of polyamic acid, poly(acrylic acid), and polyvinyl alcohol units was prepared via two ester bonds formed by two ester linkers during reaction between a hydroxyl group of polyamic acid and a carboxyl group of poly(acrylic acid) and between a carboxyl group of poly(acrylic acid) and a hydroxyl group of polyvinyl alcohol. The cross-linked polymer product has a three-dimensional (3D) network structure since polyamic acid, poly(acrylic acid), and polyvinyl alcohol units are cross-linked at a plurality of sites.

Example 2

Preparation of Binder (Weight Ratio of LiPI—OH:PAA:PVA=20:40:40, Molar Ratio of PMDA:ODA:BisAPAF=4:3:1)

A cross-linked polymer product was prepared in the same manner as in Example 1, except that the polyamic acid copolymer represented by Formula 12, poly(acrylic acid), and polyvinyl alcohol were mixed in a weight ratio of 20:40:40.

Example 3

Preparation of Binder (Weight ratio of LiPI—OH:PAA:PVA=20:20:60, Molar Ratio of PMDA:ODA:BisAPAF=4:3:1)

A cross-linked polymer product was prepared in the same manner as in Example 1, except that the polyamic acid copolymer represented by Formula 12, poly(acrylic acid), and polyvinyl alcohol were mixed in a weight ratio of 20:20:60.

Example 4

Preparation of Binder (Weight ratio of LiPI—OH:LiPAA:PVA=20:60:20, Molar Ratio of PMDA:ODA:BisAPAF=4:3:1)

Lithium poly(acrylic acid) (LiPAA) (1.0 eq. of Li per carboxylate) was prepared by adding 33.24 g (10% by weight) of a LiOH aqueous solution to 100 g (10% by weight) of an aqueous solution of poly(acrylic acid) (weight average molecular weight Mw: 450,000 Da, Aldrich, 181285).

A cross-linked polymer product was prepared in the same manner as in Example 1, except that lithium poly(acrylic acid) (LiPAA) prepared as described above in which 1.0 eq. of the —COOH groups of the poly(acrylic acid) were substituted with lithium ions (i.e., as COO—Li⁺, LiPAA)

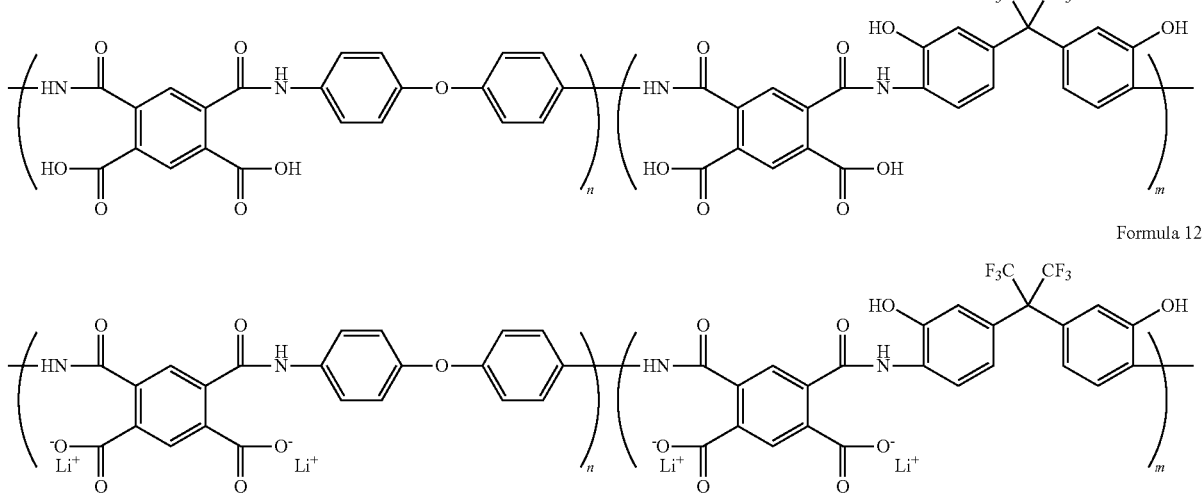

Formula 11

Formula 12 was mixed with the polyamic acid copolymer represented by Formula 12 and polyvinyl alcohol (PVA).

Example 5

Preparation of Binder (Weight Ratio of LiPI—OH:LiPAA:PVA=20:40:40, Molar Ratio of PMDA:ODA:BisAPAF=4:3:1)

LiPAA (1.0 eq. of Li per carboxylate) was prepared by adding 33.24 g (10% by weight) of a LiOH aqueous solution to 100 g (10% by weight) of an aqueous solution of poly(acrylic acid) (weight average molecular weight Mw: 450,000 Da, Aldrich, 181285).

A cross-linked polymer product was prepared in the same manner as in Example 2, except that lithium poly(acrylic acid) prepared as described above in which 1.0 eq. of the —COOH groups of the poly(acrylic acid) was substituted with lithium ions to form COO—Li⁺ (i.e., LiPAA) was mixed with the polyamic acid copolymer represented by Formula 12 and polyvinyl alcohol.

Example 6

Preparation of Binder (Weight Ratio of LiPI—OH:LiPAA:PVA=20:20:60, Molar Ratio of PMDA:ODA:BisAPAF=4:3:1)

LiPAA (1.0 eq. of Li per carboxylate) was prepared by adding 33.24 g (10% by weight) of a LiOH aqueous solution to 100 g (10% by weight) of an aqueous solution of poly(acrylic acid) (weight average molecular weight Mw: 450,000 Da, Aldrich, 181285).

A cross-linked polymer product was prepared in the same manner as in Example 3, except that lithium poly(acrylic acid) prepared as described above in which 1.0 eq. of the —COOH groups of poly(acrylic acid) were substituted with lithium to form COO—Li$^+$ (i.e., LiPAA) was mixed with polyamic acid copolymer represented by Formula 12 and polyvinyl alcohol.

Example 7

Preparation of Binder (Weight Ratio of LiPI—OH:PAA:PVA=20:40:40, Molar Ratio of PMDA:ODA:BisAPAF=2:1:1)

A cross-linked polymer product was prepared in the same manner as in Example 2, except that the mole fractions n and m of the repeating units of polyamic acid represented by Formulae 11 and 12 was 1:1, by adjusting the molar ratio of PMDA:ODA:BisAPAF to 2:1:1 during the preparation of polyamic acid represented by Formula 11 (PMDA/ODA/BisAPAF, acid equivalents: 225 g/eq., weight average molecular weight Mw: about 500,000 Da).

Example 8

Preparation of Binder (Weight Ratio of LiPI—OH:PAA:PVA=20:40:40, Molar Ratio of PMDA:ODA:BisAPAF=4:1:3)

A cross-linked polymer product was prepared in the same manner as in Example 2, except that the mole fractions n and m of the repeating units of polyamic acid represented by Formulae 11 and 12 was 1:3, by adjusting the molar ratio of PMDA:ODA:BisAPAF to 4:1:3 during the preparation of polyamic acid represented by Formula 11 (PMDA/ODA/BisAPAF, acid equivalents: 225 g/eq., weight average molecular weight Mw: about 500,000 Da).

Example 9

Preparation of Binder (Weight Ratio of LiPI—OH:PAA:PVA=20:40:40, Molar Ratio of PMDA:ODA:DC Ph=4:3:1)

After a three-necked round bottom flask was filled with nitrogen, 7.1372 g (0.0356 mol) of 4,4'-oxydianiline (ODA) and 2.3413 g (0.0119 mol) of 3,5-dichlorophenol (DCPh) were added thereto, and then 180 g of N-methylpyrrolidone (NMP) was added thereto. The mixture was completely dissolved by using a mechanical stirrer. Next, 10.5215 g (0.0482 mol) of pyromellitic dianhydride (PMDA) was added thereto and the flask was maintained at room temperature for 24 hours while stirring to prepare polyamic acid represented by Formula 13 below (PMDA/ODA/DCPh, acid equivalents: 205 g/eq., weight average molecular weight Mw: about 100,000 Da). Polyamic acid is a random copolymer. A molar ratio of PMDA:ODA:DCPh was 4:3:1.

23.1 g (10% by weight, 1.0 eq. to carboxylic acid groups of the polyamic acid) of a LiOH aqueous solution was added to polyamic acid represented by Formula 13 below (PMDA/ODA/DCPh, acid equivalent: 205 g/eq., weight average molecular weight Mw: about 100,000 Da) to prepare polyamic acid represented by Formula 14 in which 1.0 eq. of the —COOH groups of polyamic acid were substituted with lithium to form COO—Li$^+$. Mole fractions n and m of repeating units of polyamic acid represented by Formulae 13 and 14 were 3:1.

Polyamic acid represented by Formula 14 below, poly(acrylic acid) (weight average molecular weight Mw: 450,000 Da, Aldrich, 181285), and polyvinyl alcohol (weight average molecular weight Mw: 89,000 Da, saponification ratio of 99% or greater, Aldrich, 341584) were heat-treated in a weight ratio of 20:40:40 in a vacuum oven at 180° C. for 2 hours to prepare a cross-linked polymer product. The cross-linked polymer product comprised of polyamic acid, poly(acrylic acid), and polyvinyl alcohol units was prepared via two ester bonds formed by two ester linkers during reaction between a hydroxyl group of polyamic acid and a carboxyl group of poly(acrylic acid) and between a carboxyl group of poly(acrylic acid) and a hydroxyl group of polyvinyl alcohol. The cross-linked polymer product has a 3D network structure since polyamic acid, poly(acrylic acid), and polyvinyl alcohol units are cross-linked at a plurality of sites.

Formula 13

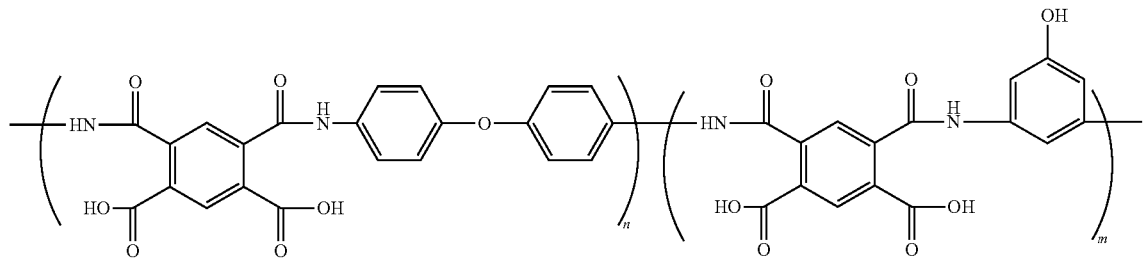

Formula 14

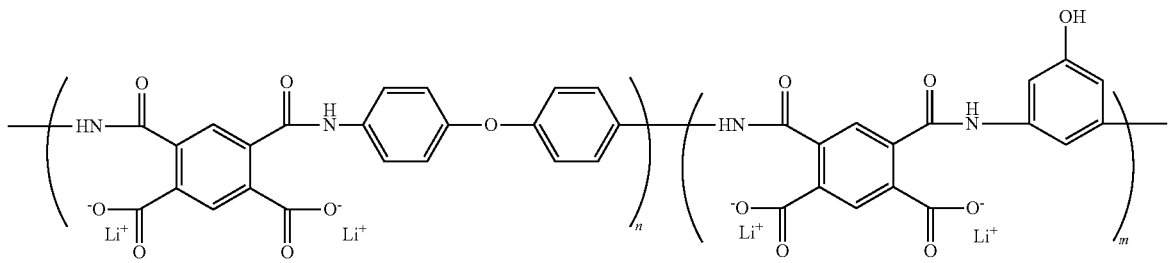

Comparative Example 1

Preparation of Binder (PAA=100)

Poly(acrylic acid) (PAA) (weight average molecular weight Mw: 450,000 Da, Aldrich, 181285) which is the same as that used in Example 1 was used.

Comparative Example 2

Preparation of Binder (Weight Ratio of PAA:PVA=50:50)

A cross-linked polymer product was prepared in the same manner as in Example 1, except that poly(acrylic acid) and polyvinyl alcohol (PVA) were cross-linked in the cross-linked polymer product via one ester bond formed by one ester linker during reaction between a carboxyl group of poly(acrylic acid) and a hydroxyl group of polyvinyl alcohol by mixing poly(acrylic acid) (weight average molecular weight Mw: 450,000 Da, Aldrich, 181285) and polyvinyl alcohol (weight average molecular weight Mw: 89,000 Da, saponification ratio of 99% or greater, Aldrich, 341584) in a weight ratio of 50:50.

Comparative Example 3

Preparation of Binder (PVA=100)

Polyvinyl alcohol (weight average molecular weight Mw: 89,000 Da, saponification ratio of 99% or greater, Aldrich, 341584) which is the same as that used in Example 1 was used.

Comparative Example 4

Preparation of Binder (Weight Ratio of LiPI—OH:PAA=20:80, Molar Ratio of PMDA:ODA:BisAPAF=4:3:1)

A cross-linked polymer product was prepared in the same manner as in Example 2, except that polyimide and poly(acrylic acid) units were cross-linked in the cross-linked polymer product via one ester bond formed by one ester linker during reaction between a hydroxyl group of polyamic acid and a carboxyl group of poly(acrylic acid) by mixing polyamic acid represented by Formula 12 and poly(acrylic acid) (weight average molecular weight Mw: 450,000 Da, Aldrich, 181285) in a weight ratio of 20:80.

Comparative Example 5

Preparation of Binder (Weight Ratio of SBR:CMC=50:50)

A mixture of styrene butadiene rubber (SBR) and carboxymethyl cellulose (CMC) mixed in a weight ratio of 1:1 was prepared.

Comparative Example 6

Preparation of Binder (Weight Ratio of LiPI—OH:PVA=20:80, Molar Ratio of PMDA:ODA:BisAPAF=4:3:1)

A mixture of polyamic acid represented by Formula 12 and polyvinyl alcohol was prepared by mixing polyamic acid represented by Formula 12 and polyvinyl alcohol (weight average molecular weight Mw: 89,000 Da, saponification ratio of 99% or greater, Aldrich, 341584) in a weight ratio of 20:80 in the same manner as in Example 2.

Comparative Example 7

Preparation of Binder (LiPAA=100)

Lithium poly(acrylic acid) (LiPAA) in which 1.0 eq. of the —COOH groups was substituted with COO—Li$^+$ was prepared by adding 33.24 g (10% by weight) of a LiOH aqueous solution to 100 g (10% by weight) of an aqueous solution of poly(acrylic acid) (weight average molecular weight Mw: 450,000 Da, Aldrich, 181285).

Comparative Example 8

Preparation of Binder (Weight Ratio of LiPI—OH:LiPI—COOH=50:50, Molar Ratio of PMDA:ODA:BisAPAF=4:3:1, Molar Ratio of PMDA:ODA:DABA=4:3:1)

Polyamic acid represented by Formula 12 was prepared in the same manner as in Example 2.
After a three-necked round bottom flask was filled with nitrogen, 9.9790 g (0.0498 mol) of 4,4'-oxydianiline (ODA) and 2.5275 g (0.0166 mol) of 1,3-diaminobenzoic acid (DABA) were added thereto, and then 153 g of N-methylpyrrolidone (NMP) was added thereto. The mixture was completely dissolved by using a mechanical stirrer. Next, 14.4935 g (0.0664 mol) of pyromellitic dianhydride (PMDA) was added thereto and the flask was maintained at room temperature for 24 hours while stirring to prepare polyamic acid represented by Formula 15 below (PMDA/

ODA/DABA, acid equivalents: 210 g/eq., weight average molecular weight Mw: about 1,000,000 Da). Polyamic acid is a random copolymer. A molar ratio of PMDA:ODA:DABA was 4:3:1.

A LiOH aqueous solution (10% by weight, 1.0 eq. to carboxylic acid groups of the polyamic acid) was added to polyamic acid represented by Formula 15 below (PMDA/ODA/DABA, acid equivalents: 210 g/eq., weight average molecular weight Mw: about 1,000,000 Da) to prepare polyamic acid represented by Formula 16 below in which 1.0 eq. of the —COOH groups of polyamic acid was substituted with COO—Li$^+$. Mole fractions n and m of repeating units of polyamic acid represented by Formulae 15 and 16 were 3:1.

Polyamic acid represented by Formula 12 above and polyamic acid represented by Formula 16 below were mixed in a weight ratio of 50:50 and heat-treated in a vacuum oven at 180° C. for 2 hours to perform cross-linking polymerization, thereby preparing a cross-linked polymer product. The cross-linked polymer product of a polyimide unit derived from polyamic acid represented by Formula 12 above and a polyimide unit derived from polyamic acid represented by Formula 16 below was prepared via one ester bond formed by one ester linker during reaction between a hydroxyl group of polyamic acid represented by Formula 12 above and a carboxyl group of polyamic acid represented by Formula 16 below.

represented by Formula 17 below (PMDA/ODA, acid equivalents: 209 g/eq., weight average molecular weight Mw: about 800,000 Da). A molar ratio of PMDA:ODA was 1:1. In Formula 17, n indicates the degree of polymerization from about 2,000 to about 10,000.

A LiOH aqueous solution (10% by weight, 1.0 eq. to carboxylic acid groups of the polyamic acid) was added to polyamic acid represented by Formula 17 below (PMDA/ODA, acid equivalents: 209 g/eq., weight average molecular weight Mw: about 800,000 Da) to prepare polyamic acid represented by Formula 18 below in which 1.0 eq. of the —COOH groups of polyamic acid was substituted with COO—Li$^+$.

A cross-linked polymer product was prepared in the same manner as Example 1, by heat-treating polyamic acid represented by Formula 18 below, poly(acrylic acid) (weight average molecular weight Mw: 450,000, Aldrich, 181285), and polyvinyl alcohol (weight average molecular weight Mw: 89,000, saponification ratio of 99% or greater, Aldrich, 341584) in a weight ratio of 20:40:40 in a vacuum oven at 180° C. for 2 hours. The cross-linked polymer product comprised of poly(acrylic acid) units and polyvinyl alcohol units was prepared via one ester bond formed by one ester linker during reaction between carboxyl groups of polyamic acid and poly(acrylic acid) with a hydroxyl group of polyvinyl alcohol.

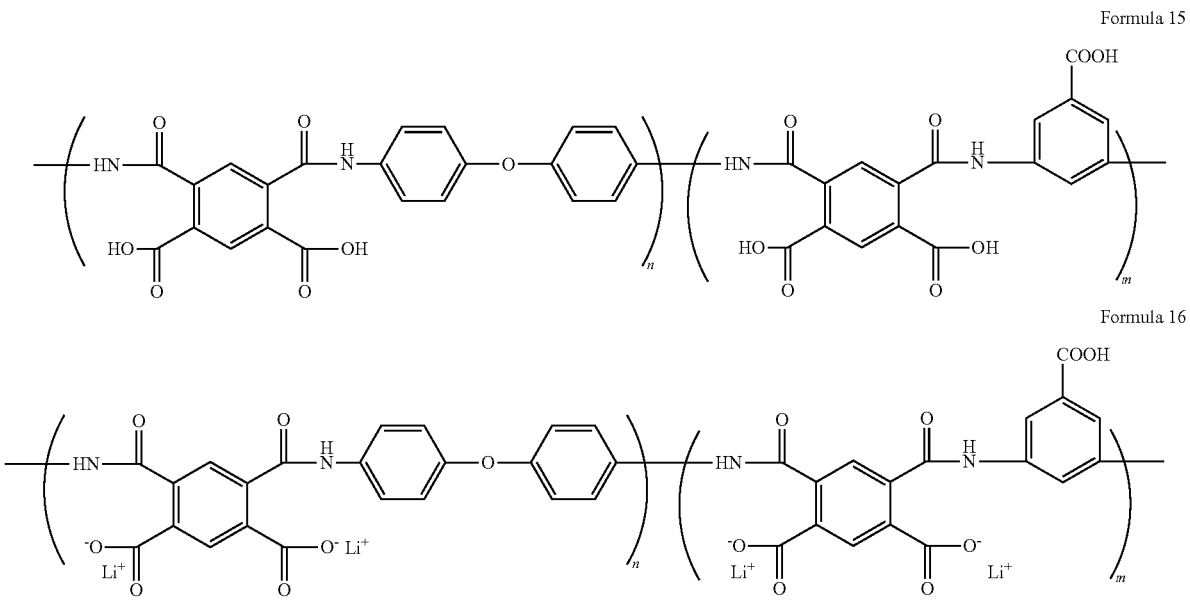

Formula 15

Formula 16

Comparative Example 10

Preparation of Binder (Weight Ratio of LiPI:PAA:PVA=20:40:40, Molar Ratio of PMDA:ODA=1:1)

After a three-necked round bottom flask was filled with nitrogen, 9.4983 g (0.0474 mol) of 4,4'-oxydianiline (ODA) was added thereto, and 180 g of N-methylpyrrolidone (NMP) was added thereto. The mixture was completely dissolved by using a mechanical stirrer. Next, 10.5017 g (0.0481 mol) of pyromellitic dianhydride (PMDA) was added thereto and the flask was maintained at room temperature for 24 hours while stirring to prepare polyamic acid

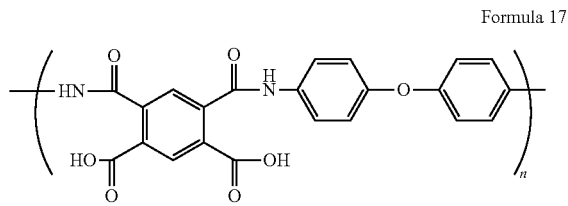

Formula 17

-continued

Formula 18

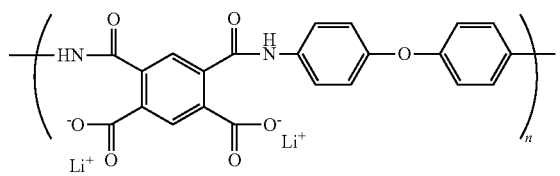

Example 10

Preparation of Negative Electrode and Lithium Battery

A negative active material slurry was prepared by mixing, in a weight ratio of 15:70:11:4, a Si—C composite as a negative active material (average particle diameter: 15 μm, Shin-Etsu), graphite powder (average particle diameter: 3 μm, BTR), artificial graphite as a conductive agent, and a binder prepared according to Example 1 (prepared by mixing lithium polyamic acid represented by Formula 12 and having a PMDA:ODA:BisAPAF molar ratio of 4:3:1, poly (acrylic acid) (weight average molecular weight Mw: 450,000 Da, Aldrich, 181285), and polyvinyl alcohol (weight average molecular weight Mw: 89,000 Da, saponification ratio of 99% or greater, Aldrich, 341584) in a weight ratio of 20:60:20), and mixing the mixture with N-methylpyrrolidone (NMP) in an agate mortar.

The negative active material slurry was coated on a copper foil current collector having a thickness of 10 μm to prepare a negative electrode plate. The completely coated electrode plate was primarily dried in an oven at 80° C. for 1 hour and secondarily dried in a vacuum oven at 180° C. for 2 hours, followed by pressing, thereby completing the manufacture of a negative electrode which includes the copper foil and the negative active material having a density of 1.57 grams per cubic centimeter (g/cc) and a thickness of 660 μm.

A CR-2032 type coin half cell was prepared by using the negative electrode, Li metal as a counter electrode, polypropylene separator (Celgard 3510), and an electrolytic solution prepared by dissolving 1.3 M $LiPF_6$ in a mixed solvent of ethylene carbonate (EC), fluoroethylene carbonate (FEC), and diethyl carbonate (DEC) in a volume ratio of 2:2:6.

Example 11

Preparation of Negative Electrode and Lithium Battery

A negative electrode and a lithium battery were prepared in the same manner as in Example 10, except that the binder was prepared according to Example 2 and comprised polyamic acid represented by Formula 12, poly(acrylic acid), and polyvinyl alcohol in a weight ratio of 20:40:40.

Example 12

Preparation of Negative Electrode and Lithium Battery

A negative electrode and a lithium battery were prepared in the same manner as in Example 10, except that the binder was prepared according to Example 3 and comprised polyamic acid represented by Formula 12, poly(acrylic acid), and polyvinyl alcohol in a weight ratio of 20:20:60.

Example 13

Preparation of Negative Electrode and Lithium Battery

A negative electrode and a lithium battery were prepared in the same manner as in Example 10, except that the binder was prepared according to Example 4 and comprised polyamic acid represented by Formula 12, lithium poly (acrylic acid), and polyvinyl alcohol in a weight ratio of 20:60:20.

Example 14

Preparation of Negative Electrode and Lithium Battery

A negative electrode and a lithium battery were prepared in the same manner as in Example 10, except that the binder was prepared according to Example 5 and comprised polyamic acid represented by Formula 12, lithium poly (acrylic acid), and polyvinyl alcohol in a weight ratio of 20:40:40.

Example 15

Preparation of Negative Electrode and Lithium Battery

A negative electrode and a lithium battery were prepared in the same manner as in Example 10, except that the binder was prepared according to Example 6 and comprised polyamic acid represented by Formula 12, lithium poly (acrylic acid), and polyvinyl alcohol in a weight ratio of 20:20:60.

Example 16

Preparation of Negative Electrode and Lithium Battery

A negative electrode and a lithium battery were prepared in the same manner as in Example 10, except that a mixture prepared by mixing, in a weight ratio of 15:70:10:5, a Si—C composite as a negative active material, graphite powder, artificial graphite as a conductive agent, and a binder prepared according to Example 7 that comprised polyamic acid represented by Formula 12 in which a molar ratio of PMDA:ODA:BisAPAF was 2:1:1, poly(acrylic acid), and polyvinyl alcohol in a weight ratio 20:60:20 was used.

Example 17

Preparation of Negative Electrode and Lithium Battery

A negative electrode and a lithium battery were prepared in the same manner as in Example 10, except that a mixture prepared by mixing, in a weight ratio of 15:70:10:5, a Si—C composite as a negative active material, graphite powder, artificial graphite as a conductive agent, and a binder prepared according to Example 8 that comprised polyamic acid represented by Formula 12 in which a molar ratio of PMDA:ODA:BisAPAF was 4:1:3, poly(acrylic acid), and polyvinyl alcohol in a weight ratio 20:60:20 was used.

Example 18

Preparation of Negative Electrode and Lithium Battery

A negative electrode and a lithium battery were prepared in the same manner as in Example 10, except that the binder prepared according to Example 9 and comprised polyamic acid represented by Formula 14 in which a molar ratio of PMDA:ODA:AmPh was 4:1:3, poly(acrylic acid), and polyvinyl alcohol in a weight ratio of 20:40:40 was used.

Example 19

Preparation of Negative Electrode and Lithium Battery

A negative electrode and a lithium battery were prepared in the same manner as in Example 10, except that a mixture prepared by mixing, in a weight ratio of 15:70:10:5, a Si—C composite as a negative active material, graphite powder, artificial graphite as a conductive agent, and a binder prepared according to Example 1 that comprised polyamic acid represented by Formula 12 in which a molar ratio of PMDA:ODA:BisAPAF was 4:3:1, poly(acrylic acid), and polyvinyl alcohol in a weight ratio 20:60:20 was used.

Comparative Example 11

Preparation of Negative Electrode and Lithium Battery

A negative electrode and a lithium battery were prepared in the same manner as in Example 10, except that only poly(acrylic acid) according to Comparative Example 1 was used as a binder.

Comparative Example 12

Preparation of Negative Electrode and Lithium Battery

A negative electrode and a lithium battery were prepared in the same manner as in Example 10, except that a binder according to Comparative Example 2 comprising poly(acrylic acid) and polyvinyl alcohol in a weight ratio of 50:50 was used.

Comparative Example 13

Preparation of Negative Electrode and Lithium Battery

A negative electrode and a lithium battery were prepared in the same manner as in Example 10, except that only polyvinyl alcohol according to Comparative Example 3 was used.

Comparative Example 14

Preparation of Negative Electrode and Lithium Battery

A negative electrode and a lithium battery were prepared in the same manner as in Example 10, except that a binder according to Comparative Example 4 comprising polyamic acid represented by Formula 12 and poly(acrylic acid) in a weight ratio of 20:80 was used.

Comparative Example 15

Preparation of Negative Electrode and Lithium Battery

A negative electrode and a lithium battery were prepared in the same manner as in Example 10, except that a binder according to Comparative Example 5 comprising styrene butadiene rubber (SBR) and carboxymethyl cellulose (CMC) in a weight ratio of 1:1 was used.

Comparative Example 16

Preparation of Negative Electrode and Lithium Battery

A negative electrode and a lithium battery were prepared in the same manner as in Example 10, except that a binder according to Comparative Example 6 comprising polyamic acid represented by Formula 12 and polyvinyl alcohol in a weight ratio of 20:80 was used.

Comparative Example 17

Preparation of Negative Electrode and Lithium Battery

A negative electrode and a lithium battery were prepared in the same manner as in Example 10, except that only lithium poly(acrylic acid) according to Comparative Example 7 was used as a binder.

Comparative Example 18

Preparation of Negative Electrode and Lithium Battery

A negative electrode and a lithium battery were prepared in the same manner as in Example 10, except that a binder prepared according to Comparative Example 8 comprising polyamic acid represented by Formula 12 and polyamic acid represented by Formula 16 in a weight ratio of 50:50 was used.

Comparative Example 20

Preparation of Negative Electrode and Lithium Battery

A negative electrode and a lithium battery were prepared in the same manner as in Example 10, except that a mixture prepared by mixing, in a weight ratio of 15:70:10:5, a Si—C composite as a negative active material, graphite powder, artificial graphite as a conductive agent, and a binder according to Comparative Example 10 comprising polyamic acid represented by Formula 18, poly(acrylic acid), and polyvinyl alcohol in a weight ratio of 20:40:40 was used.

Evaluation Example 1

Identification of Cross-Linking—IR Spectrum Analysis

Infrared (IR) spectroscopy was used to identify cross-linking of the binders prepared according to Example 2 and Comparative Example 2. The results are shown in FIG. 2.

Figure 2:
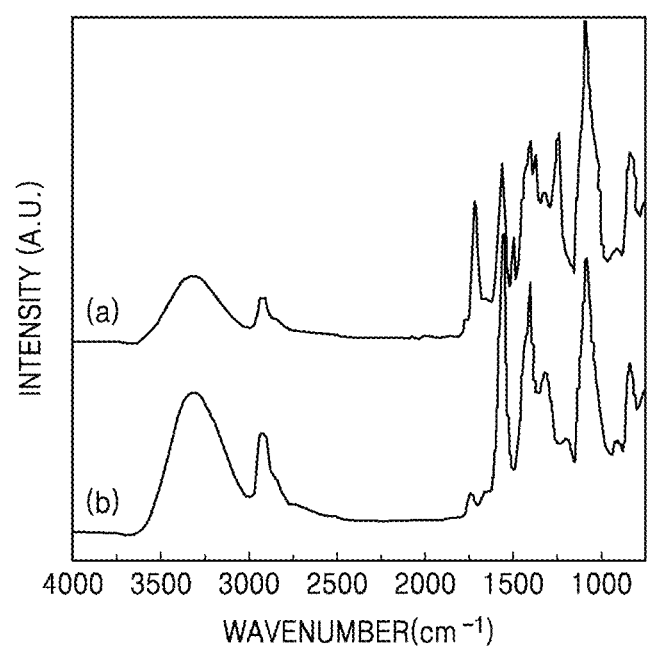
FIG. 2 is a graph of intensity (arbitrary units, A.U.) versus wavenumber (inverse centimeters, $cm^{-1}$) and illustrates infrared (IR) spectra of binders prepared according to Example 2 and Comparative Example 2.

An IR spectrum of the binder prepared according to Example 2 is shown in (a) of FIG. 2 and an IR spectrum of the binder prepared according to Comparative Example 2 is shown in (b) of FIG. 2.

While peaks by hydroxyl groups were observed in a broad range with high intensities at a wavenumber of 3000 to 3500 cm$^{-1}$ in the binder prepared according to Comparative Example 2 referring to (b) of FIG. 2, it was confirmed that the intensities of peaks considerably decreased at the same wavenumber in the binder (LiPI—OH:PAA:PVA=20:60:20, molar ratio of PMDA:ODA:BisAPAF=4:3:1) prepared according to Example 2 referring to (a) of FIG. 2.

These results indicate that the intensities of peaks decreased at corresponding wavenumbers since —OH of LiPI—OH and PVA were cross-linked with —COOH of PAA.

Evaluation Example 2

Identification of Foam Formation—Photo Analysis

Formation of bubbles and thickness of foam were evaluated based on photographs of aqueous solutions of the binders prepared according to Examples 1 to 3 and Comparative Examples 1 to 7. The results are shown in FIGS. 3A, 3B, and 3C.

The aqueous solutions of the binders were 1% by weight of aqueous solutions prepared by dissolving the binders prepared according to Examples 1 to 3 and Comparative Examples 1 to 7 in water in vials After the aqueous solutions of the binders were mixed in a vortex mixer for 30 seconds and maintained at room temperature for about 5 minutes, photographs thereof were obtained to identify foam formation.

Figure 3A:
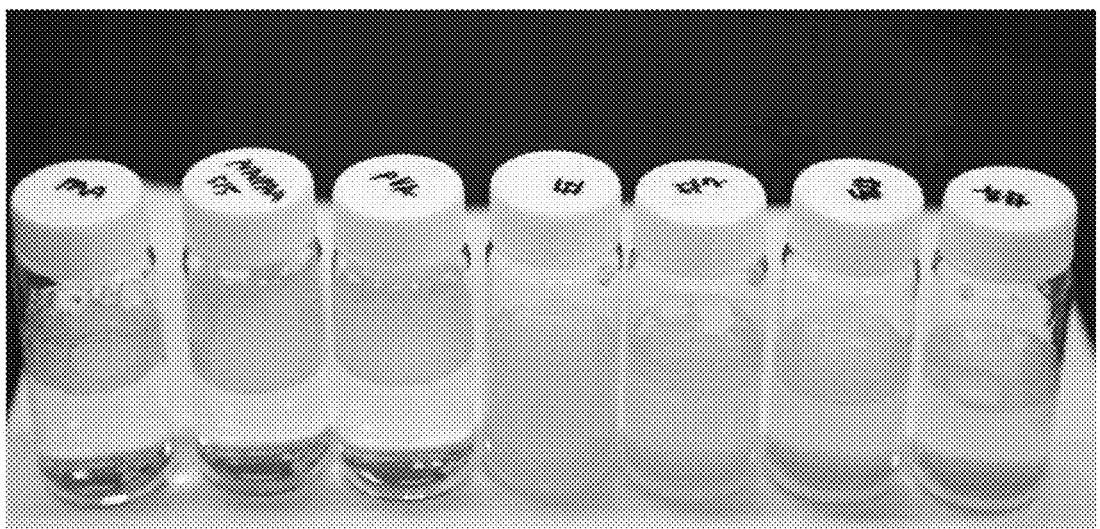
FIG. 3A is a photograph of aqueous solutions of binders prepared according to Examples 1 to 3 and Comparative Examples 1 to 4.
Figure 3B:
FIG. 3B is a photograph of aqueous solutions of binders prepared according to Comparative Examples 3 and 5 to 7.

Referring to FIGS. 3A and 3B, the aqueous solutions of the binders prepared according to Examples 1 to 3 exhibited far less formation of bubbles than the aqueous solutions of the binders prepared according to Comparative Examples 1 to 3 and Comparative Example 6.

Figure 3C:
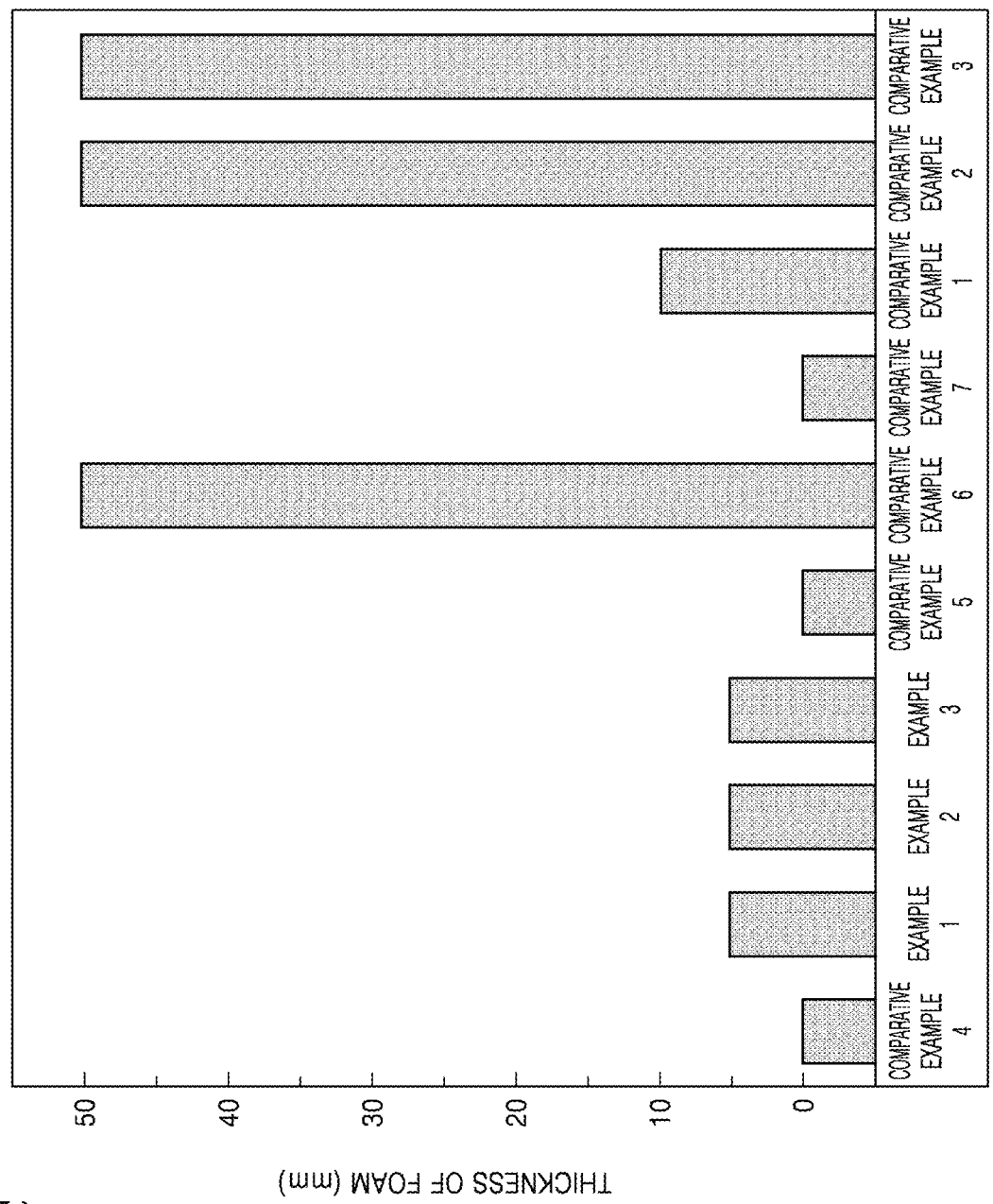
FIG. 3C is a histogram of thickness of foam (mm) versus example number, illustrating thickness of foam in aqueous solutions of binders prepared according to Examples 1 to 3 and Comparative Examples 1 to 7.

Referring to FIG. 3C, while thicknesses of the foam formed in the aqueous solutions of the binders prepared according to Examples 1 to 3 were about 5 mm, and thicknesses of the foam formed in the aqueous solutions prepared according to Comparative Examples 1 to 3 and Comparative Example 6 were from about 10 mm to about 50 mm.

Evaluation Example 3

Identification of Unevenness on Electrode Plate by Bubbles—Photo Analysis

Negative electrode plates prepared by coating the negative active material slurries prepared according to Examples 10 to 12 and Comparative Examples 12 and 13 on a copper foil current collector having a thickness of 10 μm were photographed by using a camera (Canon, EOS100D) to identify unevenness of the surfaces of the negative electrode plates caused by bubbles. The results are shown in FIGS. 4A to 4F.

Figure 4A:
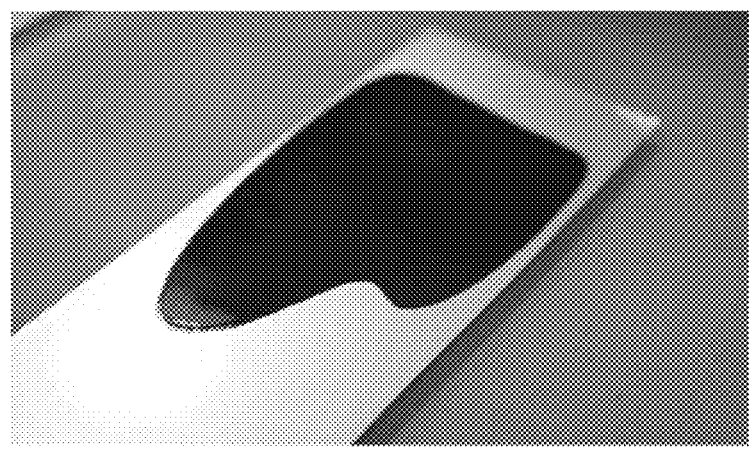
FIGS. 4A to 4E are photographs of negative electrode plates prepared by coating negative active material slurries prepared according to Examples 10 to 12 and Comparative Examples 12 and 13 on a copper foil having a thickness of 10 microns (μm), respectively.
Figure 4B:
Figure 4C:
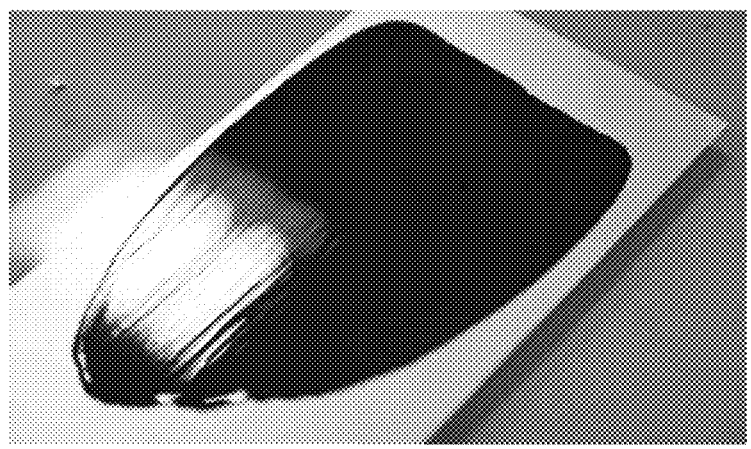
Figure 4D:
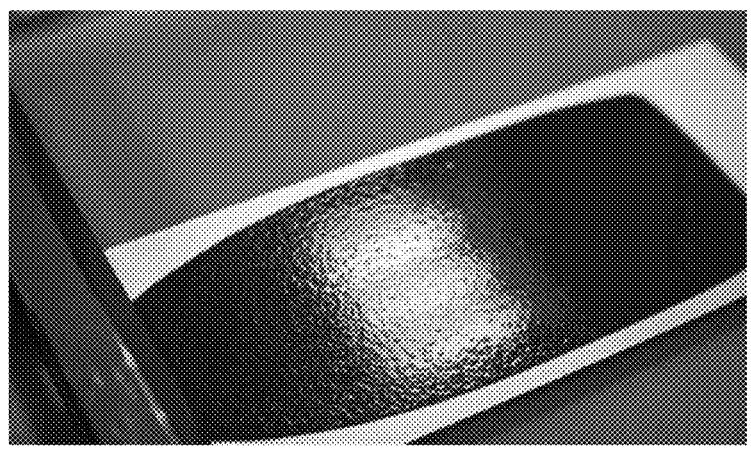
Figure 4E:
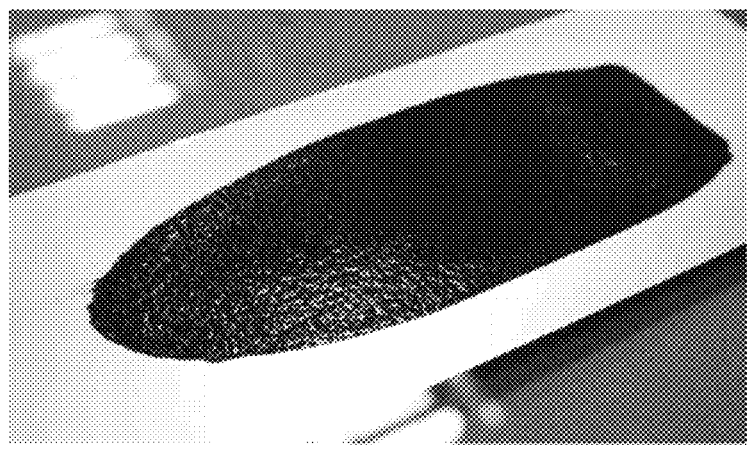

Referring to FIGS. 4A to 4C, the negative electrode plates prepared according to Examples 10 to 12 had smooth surfaces. Referring to FIGS. 4D to 4E, the negative electrode plates prepared according to Comparative Examples 12 and 13 had uneven surfaces.

Evaluation Example 4

Measurement of Surface Average Roughness Ra—Analysis by Profilometer

The negative electrode plates having a density of 1.57 g/cc and a thickness of 50 μm prepared according to Example 11 and Comparative Example 13 were punched to a size of 16 ϕ and bonded to a glass having a size of 1 cm×1 cm by using a double-sided adhesive tape, and average roughness Ra of surfaces were three-dimensionally measured by using a Profilometer (Bruker, Contour GT-X). The results are shown in FIGS. 5A and 5B.

Figure 5A:
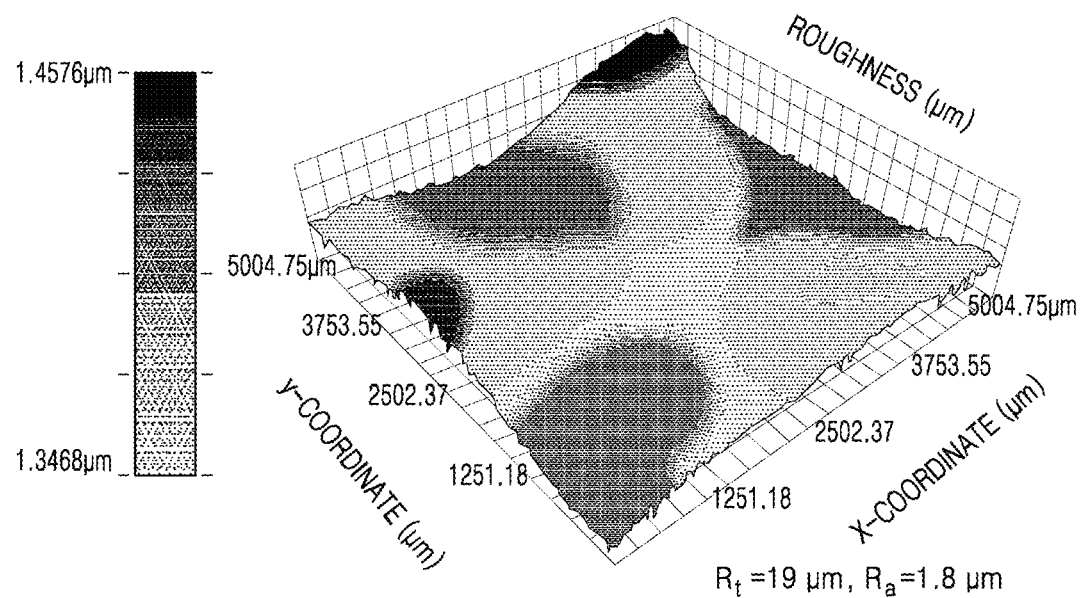
FIGS. 5A and 5B are three-dimensional graphs of y coordinate (μm) versus x coordinate (μm) versus roughness (μm) and shows measurement results of average roughness Ra of surfaces of negative electrode plates prepared according to Example 11 and Comparative Example 13, respectively, obtained by using a profilometer, wherein Rt is total height of the profile.
Figure 5B:
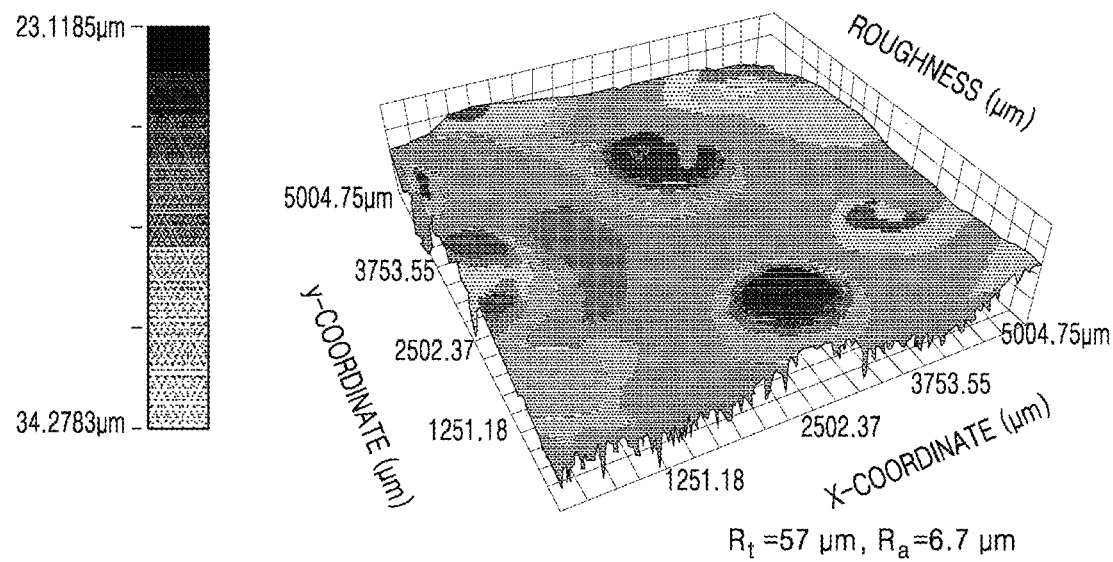

Referring to FIG. 5A, an average roughness Ra of the surface of the negative electrode plate prepared according to Example 11 was 1.8 μm. Referring to FIG. 5B, an average roughness Ra of the surface of the negative electrode plate prepared according to Comparative Example 13 was 6.7 μm. The surface average roughness Ra of the negative electrode plate of Example 11 was about one third less than that of the surface of the negative electrode plate of Comparative Example 13.

Average roughnesses Ra of the surfaces of the negative electrode plates prepared according to Examples 10 to 15 were measured in the same manner described above. The results are shown in FIG. 5C as a two dimensional graph.

Figure 5C:
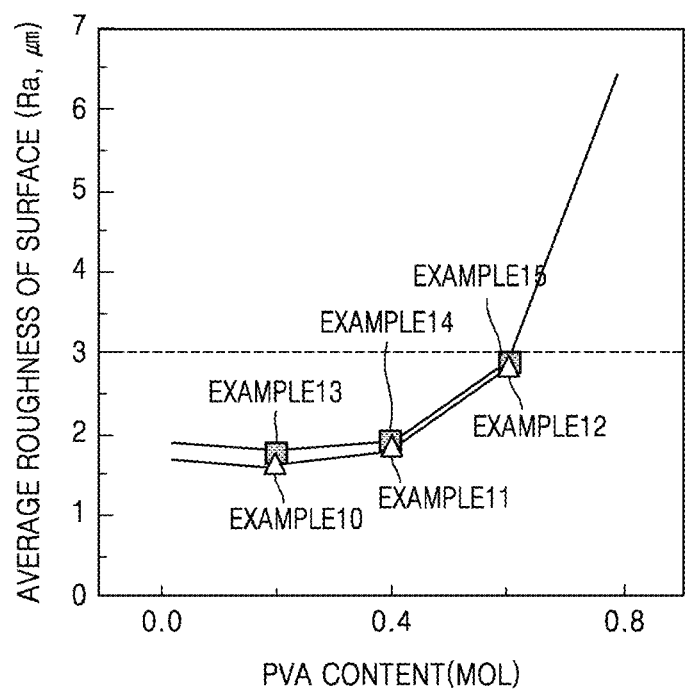
FIG. 5C is a graph of average roughness of surface (Ra, μm) versus polyvinyl alcohol content (PVA content, moles) illustrating average roughness Ra of surfaces of negative electrode plates prepared according to Examples 10 to 15.

Referring to FIG. 5C, the negative electrode plates (including unsubstituted poly(acrylic acid)) prepared according to Examples 10 to 12 and the negative electrode plates (including Li-substituted poly(acrylic acid)) prepared according to Examples 13 to 15 had similar surface average roughness Ra of 3.0 μm or less.

Evaluation Example 5

Evaluation of Physical Property of Electrode Plate—Adhesion and Cohesion

Adhesion between the negative active material layer and the current collector of each of the negative electrodes prepared according to Examples 10 to 12 and Comparative Examples 11 to 15 and 18 and cohesion between the negative active material and the binder and/or between adjacent binders thereof were evaluated respectively. The results are shown in Table 1, and FIGS. 6A and 6B.

Evaluation of adhesion and cohesion was performed as follows. After a double-sided adhesive tape (3M) (26 mm×26 mm) was bonded to one end of a slide glass (26 mm×76 mm) having a thickness of 1 to 2 mm, one end of the negative electrode (25 mm×100 mm) was bonded thereto. Next, the slide glass and the negative electrode were pulled by using a pull tester (Instron 3342) at a speed of 60 mm/min and a weight of 0.5 kgf to measure peel strength. The adhesion and cohesion forces are shown in Table 1 as grams force per centimeter (gf/cm).

TABLE 1

| | Adhesion (gf/cm) | Cohesion (gf/cm) |
|---|---|---|
| Example 10 | 7.7 | 162 |
| Example 11 | 6.2 | 168 |
| Example 12 | 1.2 | 154 |
| Comparative Example 11 | 5.3 | 19 |
| Comparative Example 12 | 3.3 | 48 |

TABLE 1-continued

|  | Adhesion (gf/cm) | Cohesion (gf/cm) |
|---|---|---|
| Comparative Example 13 | 1.2 | 65 |
| Comparative Example 14 | 4.5 | 90 |
| Comparative Example 15 | 6.0 | 45 |
| Comparative Example 18 | 5.8 | 115 |

Figure 6A:
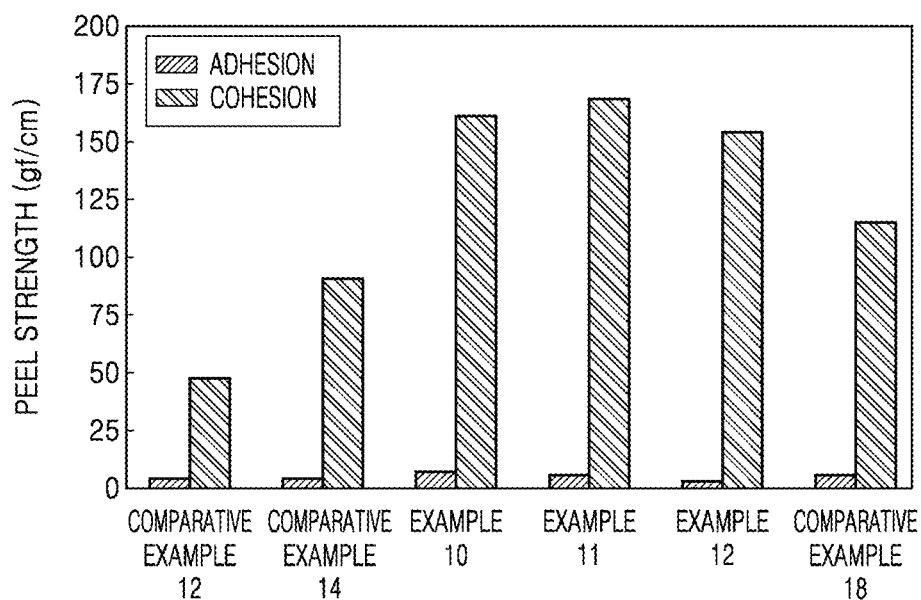
FIG. 6A is a histogram of peel strength (grams force per centimeter, gf/cm) versus example number illustrating peel strength (adhesion and cohesion) of negative electrodes prepared according to Examples 10 to 12 and Comparative Examples 12, 14, and 18.
Figure 6B:
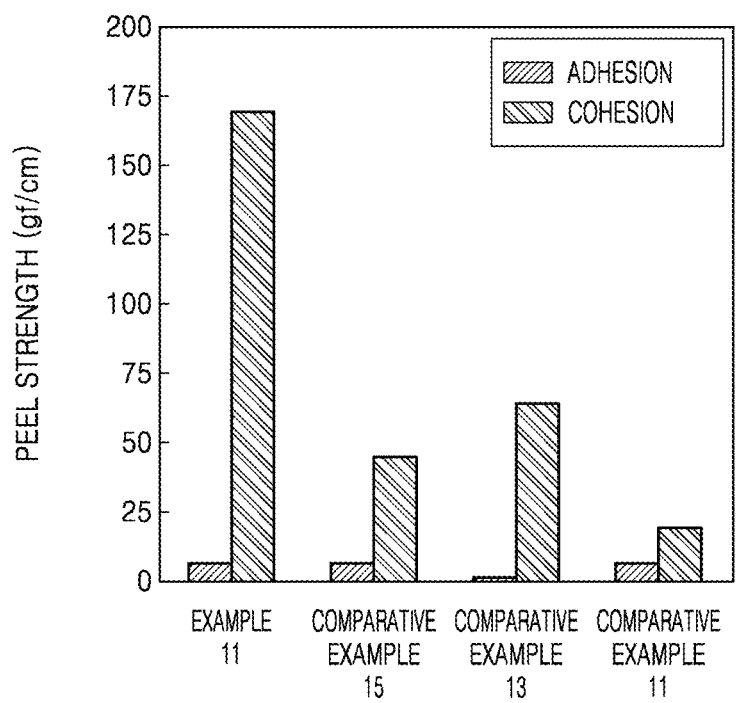
FIG. 6B is a histogram of peel strength (gf/cm) versus example number illustrating peel strength (adhesion and cohesion) of negative electrodes prepared according to Example 11 and Comparative Examples 11, 13, and 15.

Referring to Table 1 and FIGS. 6A and 6B, adhesion between the negative active material layer and the current collector of each of the negative electrodes prepared according to Examples 10 and 11 was better than adhesion between the negative active material layer and the current collector of each of the negative electrodes prepared according to Comparative Examples 11 to 15 and 18. Cohesion between the negative active material and the binder and/or between adjacent binders of each of the negative electrodes prepared according to Examples 10 to 12 was better than cohesion between the negative active material and the binder and/or between the binders of each of the negative electrodes prepared according to Comparative Examples 11 to 15 and 18.

In addition, the same tests were performed to evaluate adhesion between the negative active material and the current collector and cohesion between the negative active material and the binder and/or between adjacent binders of each of the negative electrodes prepared according to Examples 10 to 15. The results are shown in Table 2 and FIG. 6C.

TABLE 2

|  | Adhesion (gf/cm) | Cohesion (gf/cm) |
|---|---|---|
| Example 10 | 7.7 | 162 |
| Example 11 | 6.2 | 168 |
| Example 12 | 1.2 | 154 |
| Example 13 | 8.7 | 123 |
| Example 14 | 3.5 | 115 |
| Example 15 | 6.8 | 147 |

Figure 6C:
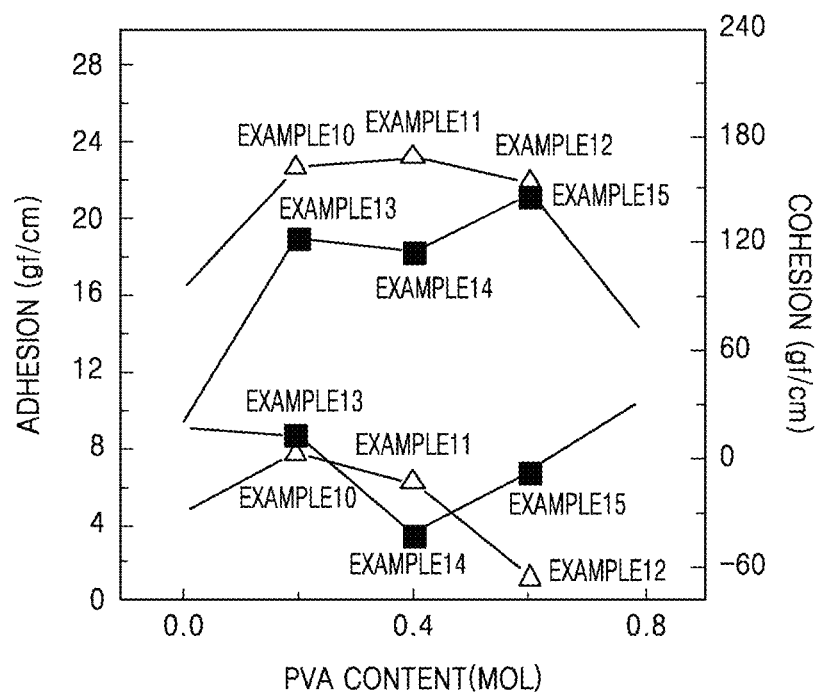
FIG. 6C is a graph of adhesion (gf/cm) and cohesion (gf/cm) versus PVA content (moles, mol) illustrating peel strength (adhesion and cohesion) of negative electrodes prepared according to Examples 10 to 15.
Figure 7A:
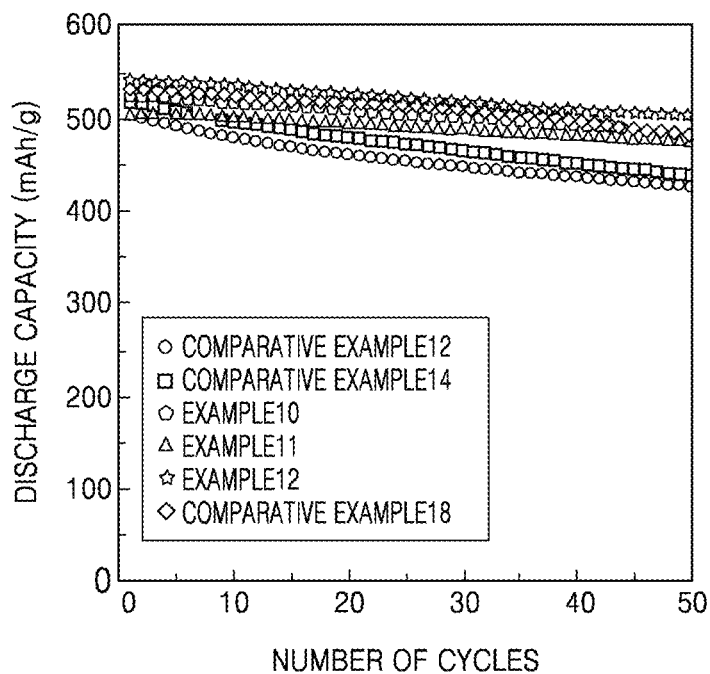
FIG. 7A is a graph of discharge capacity (milliampere hours per gram, mAh/g) versus number of cycles illustrating discharge capacity of lithium batteries (coin cells) prepared according to Examples 10 to 12 and Comparative Examples 12, 14, and 18 with respect to the number of cycles.
Figure 7B:
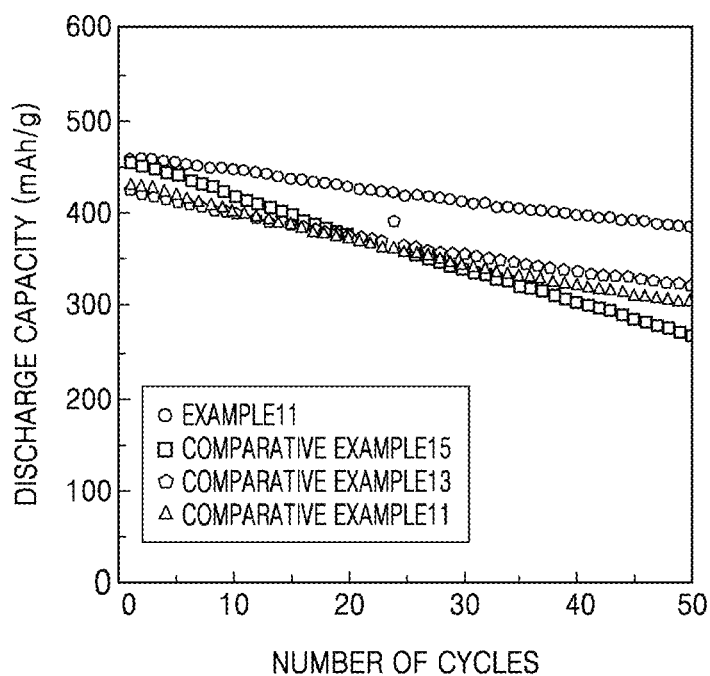
FIG. 7B is a graph of discharge capacity (mAh/g) versus number of cycles illustrating discharge capacity of lithium batteries (coin cells) prepared according to Example 11 and Comparative Examples 11, 13, and 15 with respect to the number of cycles.

Referring to Table 2 and FIG. 6C, it was confirmed that adhesion between the negative active material layer and the current collector and cohesion between the negative active material and the binder and/or between adjacent binders of each of the negative electrodes prepared according to Examples 10 to 15 were maintained at similar levels.

Evaluation Example 7

Evaluation of Charge and Discharge Characteristics—Initial Efficiency, Coulombic Efficiency, Discharge Capacity, and Capacity Retention The lithium batteries (coin cells) prepared according to Examples 10 to 15 and Comparative Examples 11 to 15 and 18 were charged at a constant current of 0.1 C at 25° C. until the voltage reached 0.01 V (vs. Li) and charged at a constant voltage of 0.01 V until the current reached 0.01 C. The charged coin cells were rested for 10 minutes and discharged at a constant current of 0.1 C until the voltage reached 1.5 V (vs. Li) ($1^{st}$ cycle).

Then, the coin cells were charged at a constant current of 0.2 C rate until the voltage reached 0.01 V (vs. Li) and charged at a constant voltage of 0.01 V until the current reached 0.01 C. The charged coin cells were rested for 10 minutes and discharged at a constant current of 0.2 C until the voltage reached 1.5 V (vs. Li) ($2^{nd}$ cycle) (The $1^{st}$ to $2^{nd}$ cycles are performed for formation).

After formation, the coin cells were charged at a constant current of 1.0 C at 25° C. until the voltage reached 0.01 V (vs. Li) and charged at a constant voltage of 0.01 V until the current reached 0.01 C. The charged coin cells were rested for 10 minutes and discharged at a constant current of 1.0 C until the voltage reached 1.5 V (vs. Li). This charging and discharging process was repeated 50 times. The results of the charging and discharging tests are partially shown in Table 3 and FIGS. 7A, 7B, 8A, 8B, and 8C. In Table 3, discharge capacity is reported as milliampere hour per gram (mAh/g).

Coulombic efficiency, initial efficiency, and capacity retention are calculated by Equations 1 to 3, respectively.

Coulombic efficiency [%]=[discharge capacity of each cycle/charge capacity of each cycle]×100%   Equation 1

Initial efficiency [%]=[discharge capacity of $1^{st}$ cycle/charge capacity of $1^{st}$ cycle]×100%   Equation 2

Capacity retention [%]=[discharge capacity of $53^{rd}$ cycle/discharge capacity of $3^{rd}$ cycle]×100%   Equation 3

TABLE 3

|  | Initial efficiency (@0.1 C, %) | Discharge capacity (@0.1 C, mAh/g) | Capacity retention (%) |
|---|---|---|---|
| Example 10 | 87.8 | 520 | 92.6 |
| Example 11 | 88.2 | 529 | 94.2 |
| Example 12 | 87.2 | 537 | 93.1 |
| Example 13 | 88.3 | 500 | 83.7 |
| Example 14 | 88.9 | 513 | 85.0 |
| Example 15 | 88.5 | 469 | 91.1 |
| Comparative Example 11 | 86.4 | 513 | 88.5 |
| Comparative Example 12 | 87.6 | 519 | 84.5 |
| Comparative Example 13 | 86.3 | 512 | 89.9 |
| Comparative Example 14 | 87.3 | 515 | 84.5 |
| Comparative Example 15 | 86.7 | 526 | 81.9 |
| Comparative Example 18 | 82.8 | 529 | 90.5 |

Referring to Table 3 and FIGS. 7A, 7B, 8A, 8B, and 8C, the lithium batteries (coin cells) prepared according to Examples 10, 11 and 13 to 15 exhibited greater Coulombic efficiencies and initial efficiencies than those of the lithium batteries (coin cells) prepared according to Comparative Examples 11 to 15 and 18. The lithium batteries (coin cells) prepared according to Examples 11 and 12 exhibited greater discharge capacities than those of the lithium batteries (coin cells) prepared according to Comparative Examples 11 to 15. The lithium batteries (coin cells) prepared according to Examples 10 to 12 and 15 exhibited greater capacity retention than the lithium batteries (coin cells) prepared according to Comparative Examples 11 to 15 and 18.

The lithium batteries (coin cells) prepared according to Examples 16, 17, and 19 and Comparative Example 20 were subjected to the charging and discharging tests as described above. The results are partially shown in Table 4 and FIG. 8D.

TABLE 4

|  | Initial efficiency (@0.1 C, %) | Capacity retention (%) |
|---|---|---|
| Example 16 | 88.5 | 97.3 |
| Example 17 | 89.3 | 99.0 |
| Example 19 | 88.8 | 98.4 |
| Comparative Example 20 | 87.9 | 96.4 |

Figure 8A:
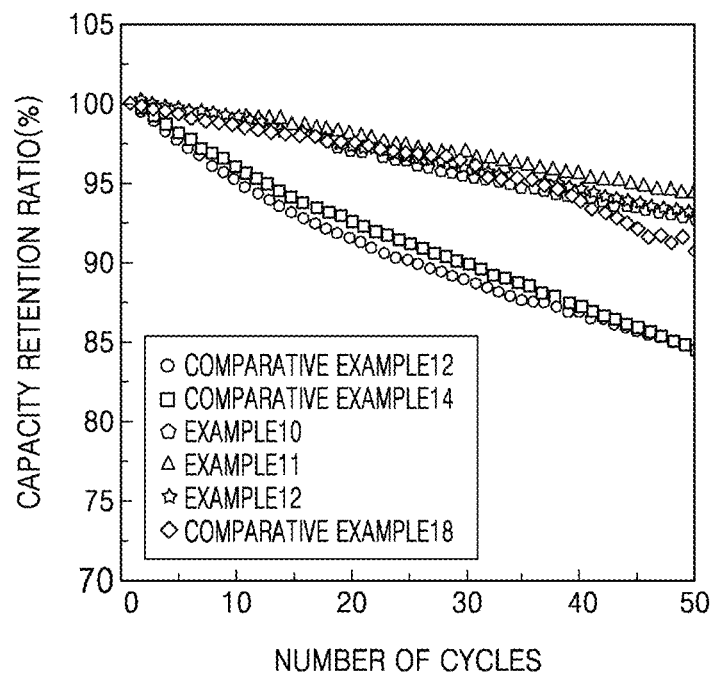
FIG. 8A is a graph of capacity retention (%) versus number of cycles illustrating capacity retention of lithium batteries (coin cells) prepared according to Examples 10 to 12 and Comparative Examples 12, 14, and 18 with respect to the number of cycles.
Figure 8B:
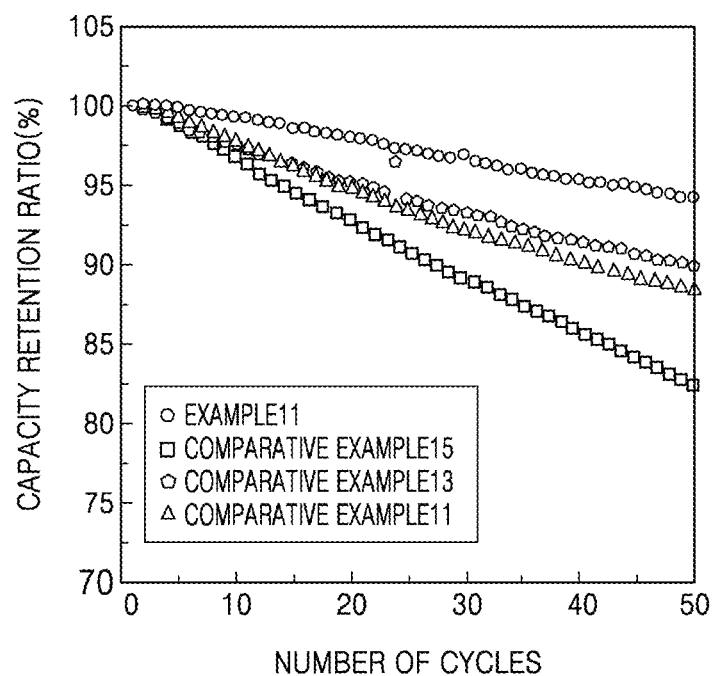
FIG. 8B is a graph of capacity retention (%) versus number of cycles illustrating capacity retention of lithium batteries (coin cells) prepared according to Example 11 and Comparative Examples 11, 13, and 15 with respect to the number of cycles.
Figure 8C:
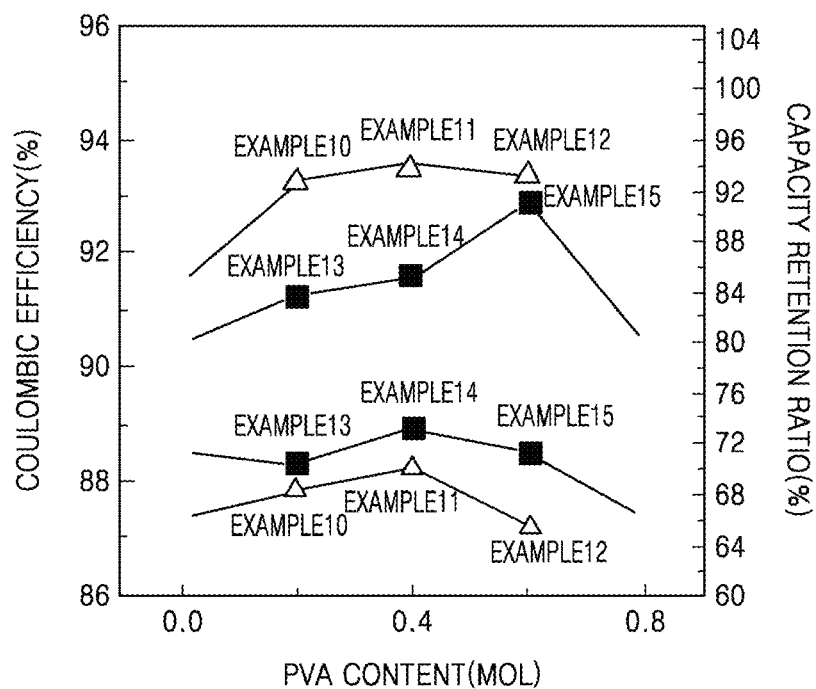
FIG. 8C is a graph of Coulombic efficiency (%) versus PVA content (mol) illustrating Coulombic efficiency and capacity retention of lithium batteries (coin cells) prepared according to Examples 10 to 15.
Figure 8D:
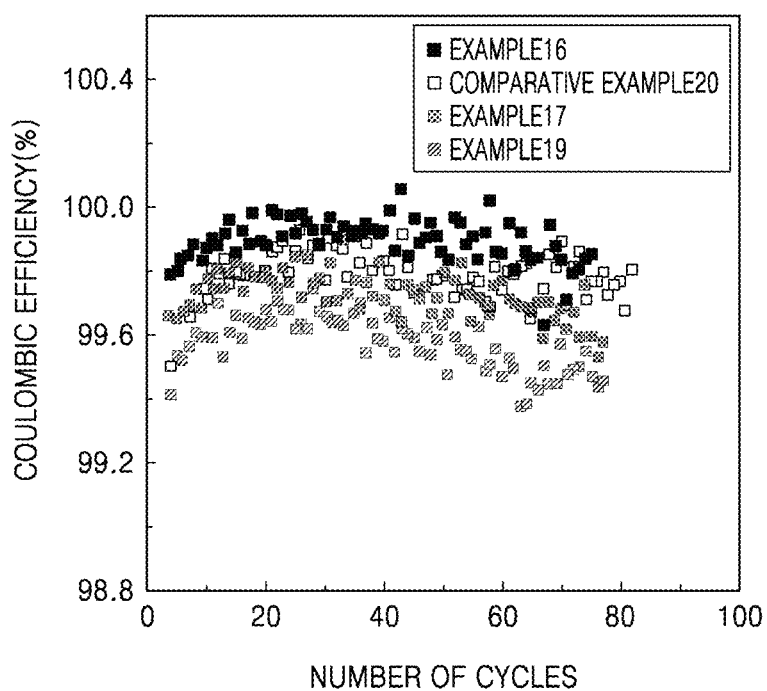
FIG. 8D is a graph of Coulombic efficiency (%) versus number of cycles illustrating Coulombic efficiency of lithium batteries (coin cells) prepared according to Examples 16, 17, and 19 and Comparative Example 20 with respect to the number of cycles.

Referring to Table 4 and FIG. 8D, the lithium batteries (coin cells) prepared according to Examples 16, 17, and 19 exhibited greater initial efficiencies and capacity retention than the lithium battery (coin cell) prepared according to Comparative Example 20.

Since the binder according to an embodiment includes a cross-linked product of at least three components of the first polymer, the second polymer, and the third polymer, which are cross-linked via at least two ester bonds, formation of bubbles may be suppressed. An electrode and a lithium battery including the binder have a lesser degree of unevenness when used in an electrode plate and provide excellent physical properties to the electrode plate, thereby improving initial efficiency, discharge capacity, and capacity retention. In addition, according to the method of preparing the binder, processibility may be improved by suppressing formation of bubbles.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A binder comprising a cross-linked product of at least a first polymer, a second polymer, and a third polymer, wherein the cross-linked product is cross-linked by at least two ester bonds or at least one ester bond and at least one amide bond;

the first polymer comprises polyimide, polyamic acid, a copolymer thereof, or a combination thereof, wherein the first polymer comprises a structural unit comprising an alkali metal and at least one hydroxyl functional group in the same or different structural units;

wherein the alkali metal is coordinated to a carbonyl group of the polyimide or the copolymer thereof, the alkali metal is bonded to a carboxyl group of the polyamic acid or the copolymer thereof, the alkali metal is coordinated to an amide group of the polyamic acid or the copolymer thereof, or a combination thereof;

the second polymer comprises poly(acrylic acid), poly(methacrylic acid), a copolymer thereof, or a combination thereof; and the third polymer comprises polyvinyl alcohol, polyacrylamide, polymethacrylamide, a copolymer thereof, or a combination thereof.

2. The binder of claim 1, wherein an amount of the alkali metal is about 0.2 equivalents to about 1 equivalent with respect to a total content of carboxyl groups, amide groups, and carbonyl groups of the first polymer.

3. The binder of claim 1, wherein the first polymer comprises a structural unit represented by Formula 1, Formula 2, or a combination thereof:

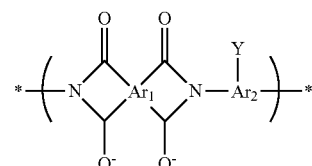

Formula 1

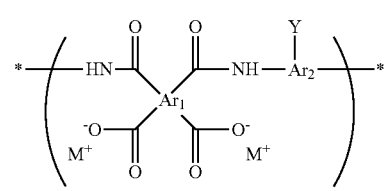

Formula 2 wherein in Formulae 1 and 2,
Ar$_1$ is an aromatic ring group of a substituted or unsubstituted tetravalent C6-C24 arylene group, a substituted or unsubstituted tetravalent C6-C24 heteroarylene group, or a combination thereof,
Ar$_2$ is an aromatic ring group of a substituted or unsubstituted C6-C24 arylene group, a substituted or unsubstituted C6-C24 heteroarylene group, or a combination thereof,
each of the aromatic ring groups is independently a single aromatic ring, a group in which two or more aromatic rings are condensed, or a group in which the two or more aromatic rings are linked to each other via a single bond, —O—, —S—, —C(=O)—, —S(=O)$_2$—, —Si(R$_a$)(R$_b$)— (wherein R$_a$ and R$_b$ are each independently a C1-C10 alkyl group), a C1-C10 alkylene group that is unsubstituted or substituted with a halogen atom, or —C(=O)=NH—,
M is an alkali metal,
Y is —OH, and
* is a binding site to an adjacent atom.

4. The binder of claim 3, wherein Ar$_1$ of Formulae 1 and 2 comprises a residue having a structural unit of a formula of Group 1 below:

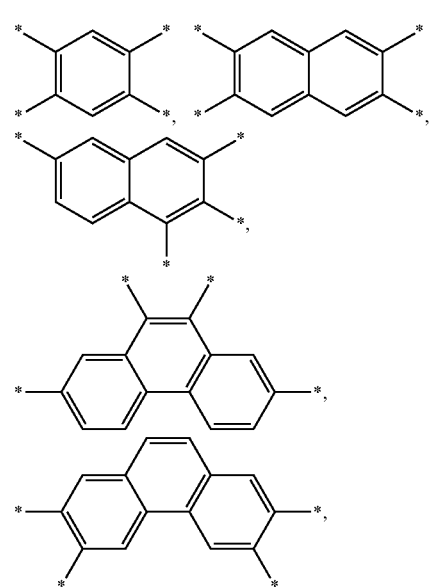

Group 1

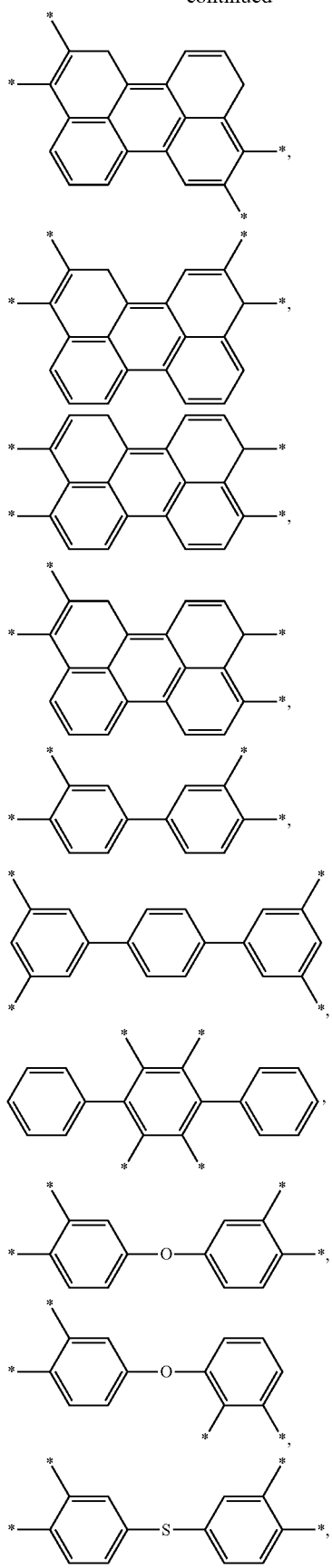
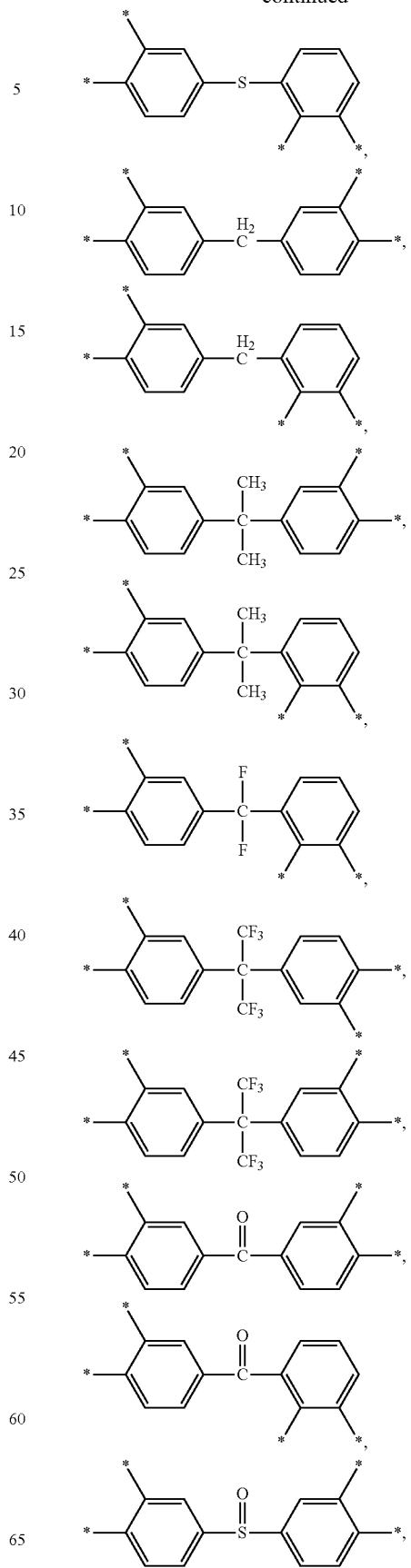

-continued

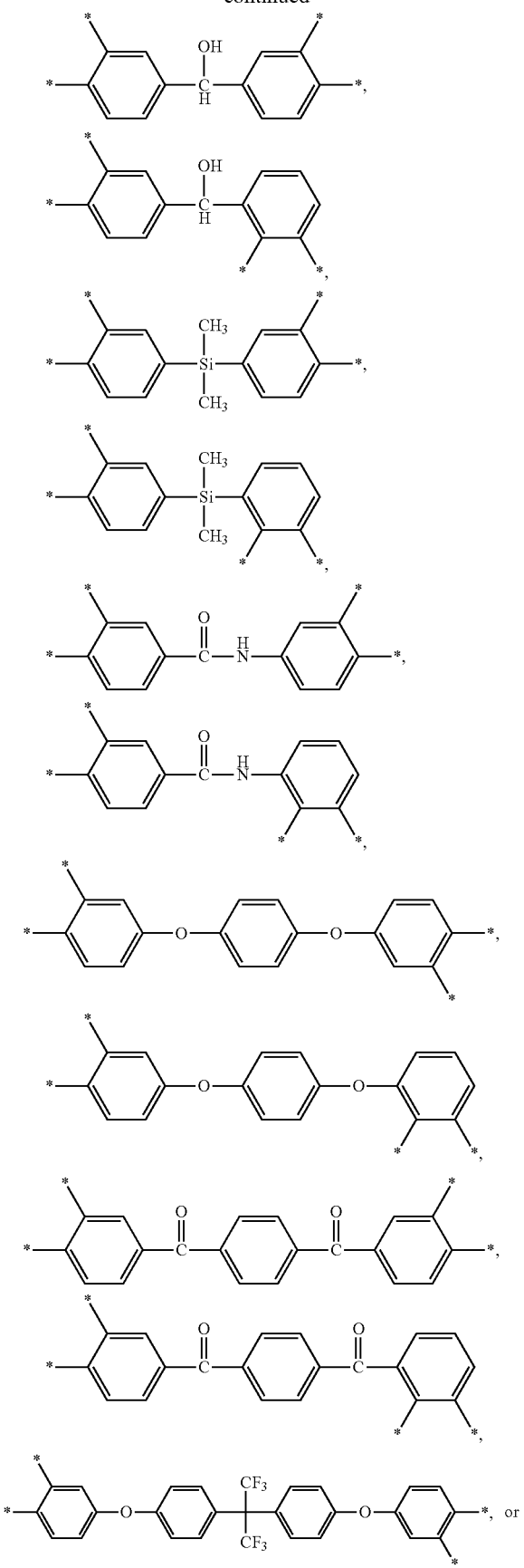

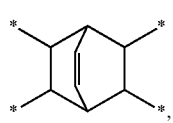

wherein in the formulae of Group 1, each residue is substituted or unsubstituted, and \* is a binding site to an adjacent atom.

5. The binder of claim 3, wherein $Ar_2$ of Formulae 1 and 2 comprises a residue having a structural unit of a formula of Group 2:

Group 2

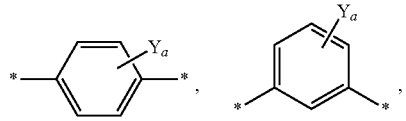

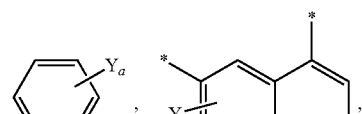

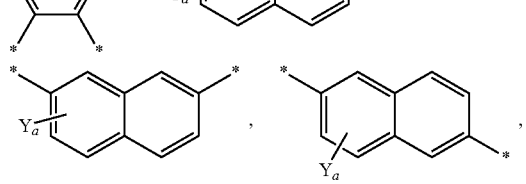

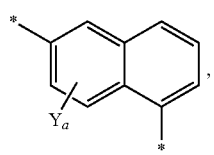

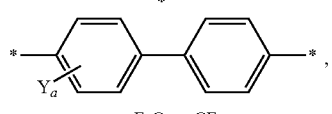

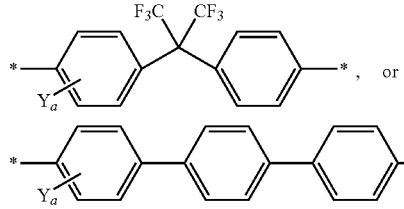

wherein in the formulae of Group 2, each residue is substituted or unsubstituted, $Y_a$ is —OH and \* is a binding site to an adjacent atom.

6. The binder of claim 3, wherein an amount of the structural unit is 20% by weight or greater based on a total weight of the first polymer.

7. The binder of claim 1, wherein the first polymer is represented by Formula 3, Formula 4, or a combination thereof:

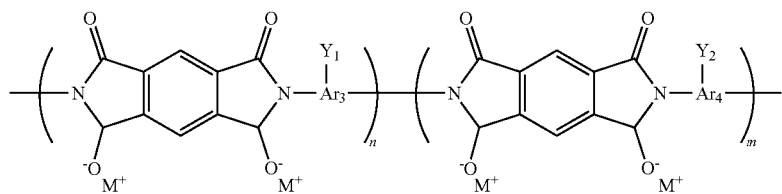

Formula 3

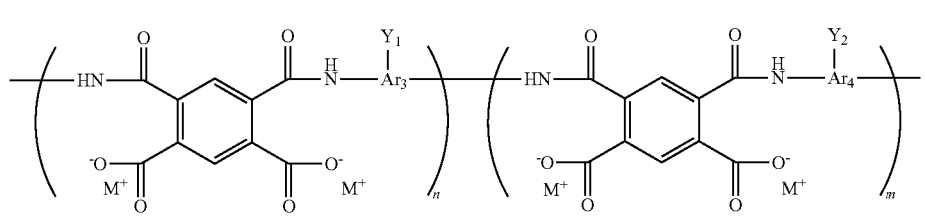

Formula 4 wherein in the Formulae 3 and 4, each $Ar_3$ and $Ar_4$ are the same or different, and are each independently an aromatic ring group of a substituted or unsubstituted C6-C24 arylene group, a substituted or unsubstituted C6-C24 heteroarylene group, or a combination thereof, the aromatic ring group is a single aromatic ring, a group in which two or more aromatic rings are condensed, or a group in which the two or more aromatic rings are linked to each other via a single bond, —O—, —S—, —C(=O)—, —S(=O)$_2$—, —Si(R$_a$)(R$_b$)— where R$_a$ and R$_b$ are each independently a C1-C10 alkyl group, a C1-C10 alkylene group that is unsubstituted or substituted with a halogen atom, or —C(=O)=NH—, each M is the same or different, and is lithium or sodium, each $Y_1$ is the same or different, and is a hydrogen atom, a halogen atom, —COOH, —OH, —CHO, —C(=O)NH$_2$, a substituted or unsubstituted C1-C10 alkyl group, a C6-C20 aryl group that is unsubstituted or substituted with a halogen atom, or a C2-C20 heteroaryl group that is unsubstituted or substituted with a halogen atom, or an combination thereof, each $Y_2$ is the same or different, and is —OH, and n and m are mole fractions in repeating units, wherein n and m for Formulae 3 and 4 are each independently 0<n<1, 0<m<1, and n+m=1.

8. The binder of claim 1, wherein the first polymer is represented by Formula 5, Formula 6, or a combination thereof:

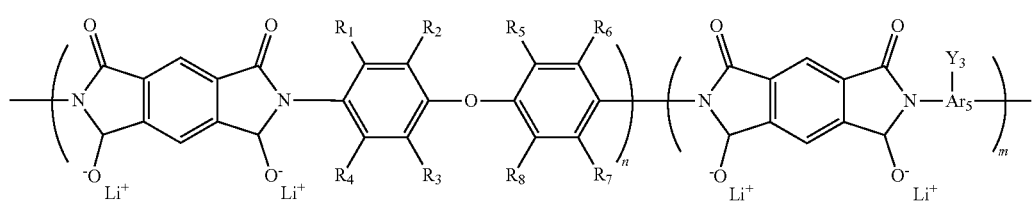

Formula 5

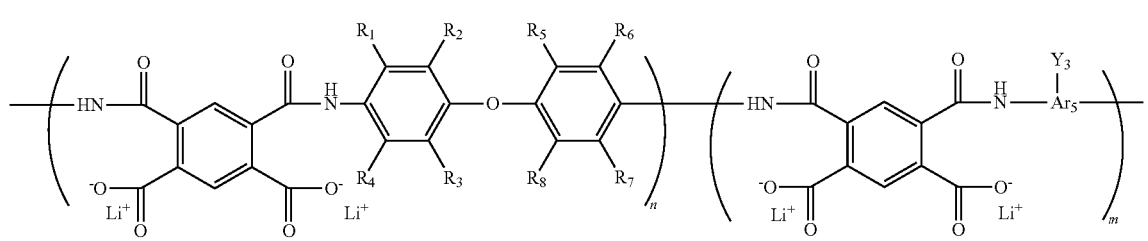

Formula 6 wherein in Formulae 5 and 6, each $R_1$, $R_2$, $R_3$, $R_4$, $R_5$, $R_6$, $R_7$, and $R_8$ is the same or different, and are each independently a hydrogen atom, a halogen atom, —COOH, —OH, —CHO, —C(=O)NH$_2$, a substituted or unsubstituted C1-C10 alkyl group, a C6-C20 aryl group that is unsubstituted or substituted with a halogen atom, a C2-C20 heteroaryl group that is unsubstituted or substituted with a halogen atom, or a combination thereof, each $Ar_5$ is the same or different, and is an aromatic ring group of a substituted or unsubstituted C6-C24 arylene group, a substituted or unsubstituted C6-C24 heteroarylene group, or a combination thereof, the aromatic ring group is a single aromatic ring, a group in which two or more aromatic rings are condensed, or a group in which the two or more aromatic rings are linked to each other via a single bond, —O—, —S—, —C(=O)—, —S(=O)₂—, —Si(R$_a$)(R$_b$)— where R$_a$ and R$_b$ are each independently a C1-C10 alkyl group, a C1-C10 alkylene group that is unsubstituted or substituted with a halogen atom, or C(=O)—NH—, each Y$_3$ is the same or different, and is —OH, and n and m are mole fractions in repeating units, wherein n and m for Formulae 5 and 6 are each independently 0<n<1, 0<m<1, and n+m=1.

9. The binder of claim 8, wherein Ar$_5$ of Formulae 5 and 6 comprises a residue having a structural unit of a formula of Group 3:

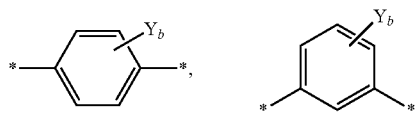

Group 3

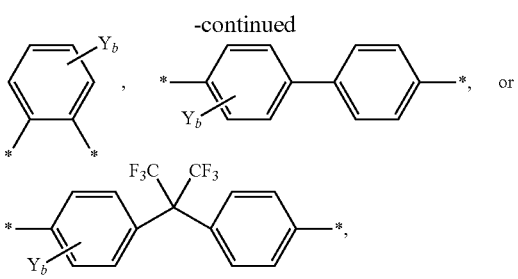

-continued wherein in the formulae of Group 3,
each residue is substituted or unsubstituted,
Y$_b$ is —OH and
* is a binding site to an adjacent atom.

10. The binder of claim 8, wherein n and m for Formulae 5 and 6 are each independently 0.2<n<0.8, 0.2<m<0.8, and n+m=1.

11. The binder of claim 1, wherein the first polymer is represented by Formula 7, Formula 8, Formula 9, Formula 10, or a combination thereof:

Formula 7

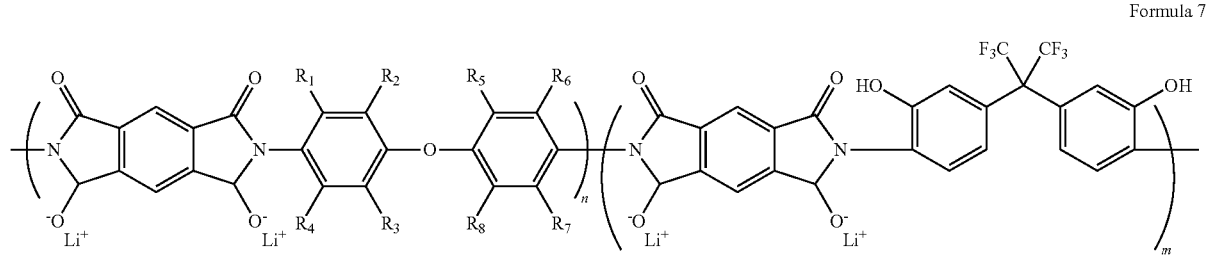

Formula 8

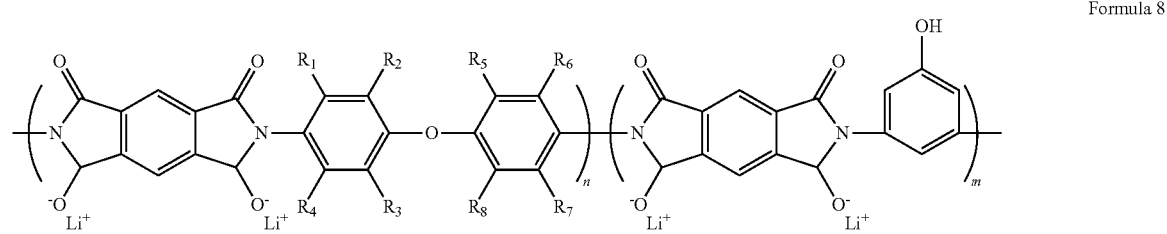

Formula 9

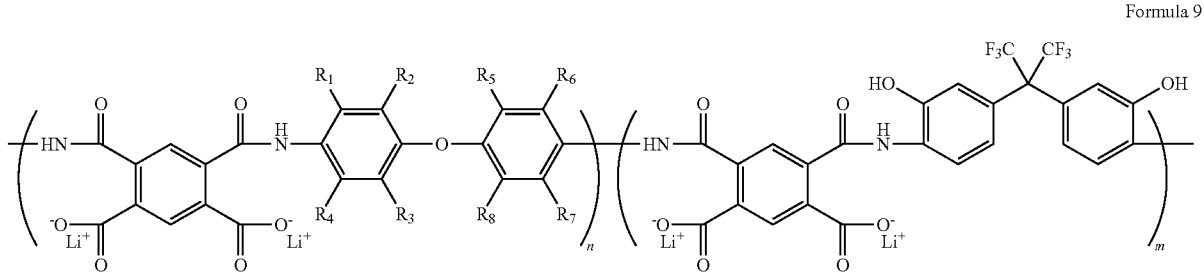

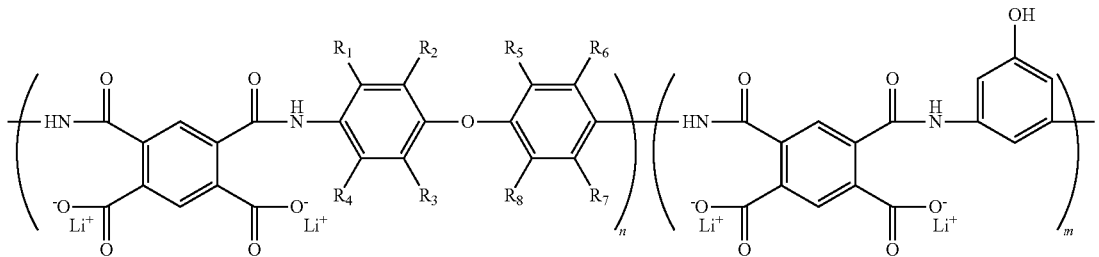

Formula 10 wherein in Formulae 7, 8, 9, and 10, each $R_1$, $R_2$, $R_3$, $R_4$, $R_5$, $R_6$, $R_7$, and $R_8$ is the same or different, and are each independently a hydrogen atom, a halogen atom, —COOH, —OH, —CHO, —C(=O)NH$_2$, a substituted or unsubstituted C1-C10 alkyl group, a C6-C20 aryl group that is unsubstituted or substituted with a halogen atom, or a C2-C20 heteroaryl group that is unsubstituted or substituted with a halogen atom, or a combination thereof, and n and m are mole fractions in repeating units, wherein n and m for Formulae 7, 8, 9, and 10 are each independently 0<n<1, 0<m<1, and n+m=1.

12. The binder of claim 1, wherein the second polymer further comprises a structural unit comprising an alkali metal.

13. The binder of claim 12, wherein an amount of the alkali metal is about 0.2 equivalents to about 1 equivalent with respect to a total content of carboxyl groups and amide groups of the first polymer.

14. The binder of claim 1, wherein the second polymer is poly(acrylic acid).

15. The binder of claim 14, wherein poly(acrylic acid) has a weight average molecular weight of about 10,000 Daltons to about 1,000,000 Daltons.

16. The binder of claim 1, wherein the third polymer is polyvinyl alcohol.

17. The binder of claim 16, wherein the polyvinyl alcohol has a saponification ratio of 90% or greater.

18. The binder of claim 1, wherein the polyvinyl alcohol has a weight average molecular weight of about 10,000 Daltons to about 500,000 Daltons.

19. The binder of claim 1, wherein an amount of the first polymer is in a range of about 3% by weight to about 30% by weight based on a total weight of the cross-linked product.

20. The binder of claim 1, wherein an amount of the third polymer is in a range of about 5% by weight to about 60% by weight based on a total weight of the cross-linked product.

21. The binder of claim 1, further comprising an antifoaming agent.

22. The binder of claim 1, wherein the cross-linked product has a weight average molecular weight of about 10,000 Daltons to about 2,000,000 Daltons.

23. An electrode comprising:
the binder of claim 1; and
a positive active material or a negative active material.

24. The electrode of claim 23, wherein the negative active material comprises at least one of a silicon active material, a tin active material, a silicon-tin alloy active material, and a silicon-carbon active material.

25. The electrode of claim 23, wherein a surface of the electrode has an average roughness Ra of 3 micrometers or less.

26. The electrode of claim 23, wherein a cohesion between the positive active material and the binder, between the negative active material and the binder, or between adjacent binders is 100 grams force per centimeter or greater.

27. A lithium battery comprising:
the electrode of claim 23, as a first electrode;
a second electrode; and
an electrolyte disposed between the first electrode and the second electrode.

28. A method of preparing a binder, the method comprising:
mixing a first composition comprising a non-aqueous solvent and a first polymer comprising polyimide, polyamic acid, a copolymer thereof, or a combination thereof, wherein the first polymer comprises a structural unit comprising an alkali metal and a structural unit comprising at least one hydroxyl functional group; a second composition comprising water and a second polymer comprising poly(acrylic acid), poly(methacrylic acid), a copolymer thereof, or a combination thereof; and a third composition comprising water and a third polymer comprising polyvinyl alcohol, polyacrylamide, polymethacrylamide, a copolymer thereof, or a combination thereof to prepare a mixture; and
heat-treating the mixture to prepare a cross-linked product and prepare the binder.

29. The method of claim 28, wherein the heat treating is performed at 150° C. or greater.

* * * * *